United States Patent
Lian et al.

(10) Patent No.: US 11,685,250 B2
(45) Date of Patent: Jun. 27, 2023

(54) HYBRID POWER-DRIVEN SYSTEM AND VEHICLE

(71) Applicant: BYD COMPANY LIMITED, Guangdong (CN)

(72) Inventors: Yubo Lian, Shenzhen (CN); Heping Ling, Shenzhen (CN); Zhen Zhai, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 199 days.

(21) Appl. No.: 17/287,068

(22) PCT Filed: Oct. 25, 2019

(86) PCT No.: PCT/CN2019/113242
§ 371 (c)(1),
(2) Date: Apr. 20, 2021

(87) PCT Pub. No.: WO2020/083366
PCT Pub. Date: Apr. 30, 2020

(65) Prior Publication Data
US 2021/0354543 A1   Nov. 18, 2021

(30) Foreign Application Priority Data
Oct. 26, 2018 (CN) .......................... 201811259862.0

(51) Int. Cl.
*B60K 6/36* (2007.10)
*B60K 6/48* (2007.10)
*B60K 6/547* (2007.10)

(52) U.S. Cl.
CPC .................. *B60K 6/36* (2013.01); *B60K 6/48* (2013.01); *B60K 6/547* (2013.01); *B60K 2006/4816* (2013.01); *B60K 2006/4841* (2013.01)

(58) Field of Classification Search
CPC . B60K 6/36; B60K 6/48; B60K 6/547; B60K 2006/4816; B60K 2006/4841
(Continued)

(56) References Cited

U.S. PATENT DOCUMENTS 8,931,371 B2 *  1/2015 Xie .......................... B60K 6/48
                                                 903/909
9,358,873 B2 *  6/2016 Moore ................... B60K 6/442
(Continued)

FOREIGN PATENT DOCUMENTS

CN       102490588 B       6/2012
CN       104773063 A       7/2015
(Continued)

OTHER PUBLICATIONS

International Search Report of PCT/CN2019/113242 dated Jan. 31, 2020 (3 pages).

*Primary Examiner* — Ha Dinh Ho
(74) *Attorney, Agent, or Firm* — Calfee Halter & Griswold LLP

(57) ABSTRACT

A hybrid power-driven system and a vehicle are provided. The hybrid power-driven system includes an engine, a transmission, and a motor power apparatus. The transmission includes a transmission mechanism and a main reducer. The motor power apparatus includes a motor and a power distribution mechanism. The power distribution mechanism includes a motor power distribution shaft, a mode selection apparatus, a first transmission apparatus, and a second transmission apparatus. The motor power distribution shaft is disposed independently from the transmission mechanism, and the motor power distribution shaft is disposed independently from the motor. A motor driven gear configured to receive power of the motor is disposed on the motor power distribution shaft.

20 Claims, 21 Drawing Sheets

(58) Field of Classification Search
USPC .......................................................... 74/661
See application file for complete search history.

(56) References Cited

U.S. PATENT DOCUMENTS

| | | | | |
|---|---|---|---|---|
| 9,834,083 | B2* | 12/2017 | Blessing | ............... B60K 6/42 |
| 10,974,583 | B2* | 4/2021 | Huang | ............... B60K 6/24 |
| 2002/0040818 | A1 | 4/2002 | Maruyama | |
| 2012/0186392 | A1* | 7/2012 | Lethbridge | ............. B60K 6/48 |
| | | | | 74/665 A |

FOREIGN PATENT DOCUMENTS

| | | |
|---|---|---|
| CN | 105299216 A | 2/2016 |
| CN | 105398322 A | 3/2016 |
| CN | 105459790 A | 4/2016 |
| CN | 106183774 A | 12/2016 |
| CN | 206086336 U | 4/2017 |
| CN | 107539098 A | 1/2018 |
| CN | 107554280 A | 1/2018 |
| CN | 107795645 A | 3/2018 |
| CN | 108045216 A | 5/2018 |
| CN | 108162741 A | 6/2018 |
| CN | 108162743 A | 6/2018 |
| CN | 108412996 A | 8/2018 |
| EP | 2390127 A1 | 11/2011 |
| JP | 2017114305 A | 6/2017 |
| KR | 20150125089 A | 11/2015 |
| KR | 20160149370 A | 12/2016 |
| WO | 2008031389 A1 | 3/2008 |
| WO | 2016112654 A1 | 7/2016 |

* cited by examiner

HYBRID POWER-DRIVEN SYSTEM AND VEHICLE

CROSS-REFERENCE TO RELATED APPLICATIONS

This application is the U.S. national stage entry of International Application No. PCT/CN2019/113242, filed Oct. 25, 2019, which claims priority to Chinese Patent Application No. 201811259862.0, filed with the National Intellectual Property Administration, PRC on Oct. 26, 2018 and entitled "HYBRID POWER-DRIVEN SYSTEM AND VEHICLE", which are incorporated herein by reference in its their entirety.

FIELD

This application relates to the field of hybrid power technologies, and specifically, to a hybrid power-driven system and a vehicle.

BACKGROUND

With constant consumption of energy, the development and utilization of new energy vehicles have gradually become a trend. As one of the new energy vehicles, hybrid vehicles driven by engines and/or motors have multiple modes and can improve transmission efficiency and the fuel economy.

In addition, because a hybrid electric vehicle is provided with both an engine and a motor, the spatial arrangement becomes a design point of the hybrid electric vehicle. That is, how to resolve the contradiction between transmission efficiency and spatial arrangement becomes a problem that urgently needs to be resolved in the design of the hybrid electric vehicle.

SUMMARY

A technical problem to be resolved by this application is to provide a hybrid power-driven system and a vehicle, to resolve the contradiction between transmission efficiency and spatial arrangement.

To resolve the foregoing technical problem, in an aspect, embodiments of this application provide a hybrid power-driven system, including an engine, a transmission, and a motor power apparatus, the transmission including a transmission mechanism and a main reducer, the motor power apparatus including a motor and a power distribution mechanism, where the transmission mechanism includes a clutch apparatus, at least one input shaft, and at least one output shaft, at least one driving gear for forward gears is disposed on the input shaft, at least one driven gear for forward gears correspondingly meshed with the driving gear for forward gears is disposed on the output shaft, an input end of the clutch apparatus is connected to the engine, and the output shaft is connected to the main reducer to transmit power;

the power distribution mechanism includes a motor power distribution shaft, a mode selection apparatus, a first transmission apparatus, and a second transmission apparatus, the motor power distribution shaft is disposed independently from the transmission mechanism, and the motor power distribution shaft is disposed independently from the motor; and a motor driven gear configured to receive power of the motor is disposed on the motor power distribution shaft; and the first transmission apparatus includes a first gear and an input gear, the first gear is disposed on the motor power distribution shaft, the input gear is disposed on the input shaft of the transmission mechanism, the input gear is directly meshed with the first gear; the second transmission apparatus includes a second gear, the second gear is disposed on the motor power distribution shaft, the first gear and the second gear are coaxially disposed, and the second gear is directly meshed with a main reducer driven gear of the main reducer; and the mode selection apparatus selectively connects the motor and the input shaft of the transmission mechanism or the motor and the main reducer.

Embodiments of this application further provide a hybrid power-driven system, including an engine, a transmission, and a motor power apparatus, the transmission and the motor power apparatus being two independent modules, the motor power apparatus including a motor and a power distribution mechanism, where the power distribution mechanism includes a motor power distribution shaft, a mode selection apparatus, a first transmission apparatus, and a second transmission apparatus, the motor power distribution shaft is disposed independently from a transmission mechanism, the motor power distribution shaft is disposed independently from the motor, and the hybrid power-driven system is selectively switched between a first mode and a second mode by using the mode selection apparatus; a motor driven gear configured to receive power of the motor is disposed on the motor power distribution shaft; the first transmission apparatus includes a first gear, the first gear is disposed on the motor power distribution shaft, and the first gear is directly meshed with one gear position driving gear on an input shaft of the transmission; the second transmission apparatus includes a second gear, the second gear is disposed on the motor power distribution shaft, the first gear and the second gear are coaxially disposed, and the second gear is directly meshed with a main reducer driven gear of the transmission; and the mode selection apparatus selectively connects the motor and the input shaft of the transmission or the motor and a main reducer of the transmission. In another aspect, embodiments of this application further provide a vehicle, including the foregoing hybrid power-driven system.

For the hybrid power-driven system and the vehicle according to the embodiments of this application, a mode selection apparatus selectively connects a motor and an input shaft of a transmission mechanism or a motor and a main reducer, to enable the motor of the hybrid power-driven system to be switched between two modes. A motor power distribution shaft is disposed independently from the transmission mechanism, and the motor power distribution shaft is disposed independently from the motor. The independently disposed power distribution shaft appropriately utilizes a radial space of the system. It is not necessary to make a significant change to a transmission mechanism of an original engine. A power distribution mechanism may independently transmit power of the motor to a wheel end (the main reducer) without passing through a transmission path of the transmission mechanism (that is, it is not necessary to depend on the input shaft and an output shaft of the transmission mechanism). Transmission paths of a motor end transmission part and a conventional transmission mechanism part have a relatively low degree of overlap (or do not overlap), thereby shortening transmission paths during driving and power generation of the motor. In this way, the control of the system is simpler and more efficient, and efficient transmission of the motor is ensured, thereby resolving the contradiction between transmission efficiency and spatial arrangement to a particular degree. Both the transmission between the power distribution mechanism and the input shaft of the transmission mechanism and the transmission between the power distribution mechanism and a main reducer driven gear of the main reducer are direct transmission, so that while the hybrid power-driven system implements switching between two modes, a transmission path is minimized, thereby greatly improving the transmission efficiency of the system. The hybrid power-driven system may be applied to hybrid electric technologies such as dual-clutch and AMT.

In addition, the hybrid power-driven system and the vehicle in the embodiments of this application further have the following advantages:

(1) For a motor size under a conventional power requirement condition in the industry, a motor and an input gear cannot be directly meshed, an idler gear needs to be added to reserve a mounting space for the motor. In this application, a motor driven gear configured to receive power of the motor is disposed on a motor power distribution shaft, so that the problem of controlling and mounting the motor is resolved, high efficiency of transmission is further ensured, and in addition an axial space for an input shaft or an output shaft of a transmission mechanism is further reduced.

(2) The power distribution shaft shares a power torque of a second mode of the system, to implement power split of an engine and a motor. The power distribution shaft is used to directly split the power of the motor into an input shaft and a main reducer driven gear on a differential. Compared with a solution of outputting power from an output shaft, a strength requirement (for example, a shaft diameter) of an output shaft is reduced, and in addition a strength requirement (for example, the diameter and thickness of a gear) of a main reducer driving gear is reduced. The power distribution shaft is used to share the power torque of the second mode, so that the system has advantages such as low costs, a small volume, a light weight, a long service life, and adequate overall vehicle performance.

(3) The power distribution shaft may be relatively short, so that a compact arrangement of the power distribution shaft and the motor can be implemented, and the power distribution shaft can further be flexibly arranged according to different vehicle body platforms and different spaces.

(4) The independently disposed power distribution shaft appropriately utilizes a radial space of the system, switching between two modes can be implemented without using an input shaft or an output shaft, and in addition efficient transmission of the motor is ensured. Other aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description made with reference to the following accompanying drawings, where.

Figure 1:
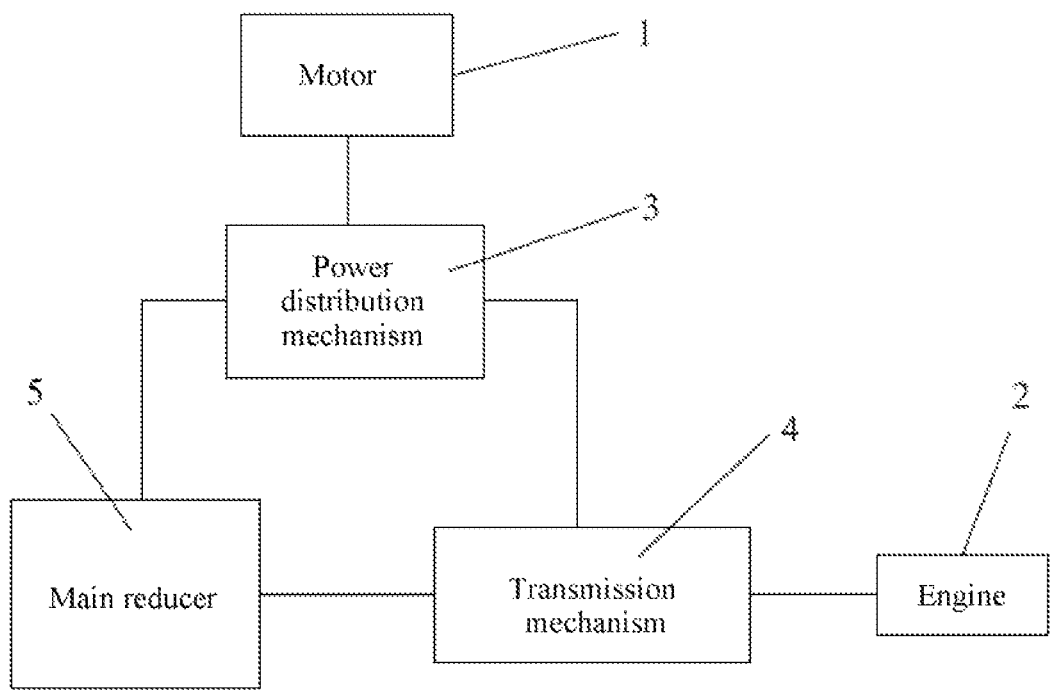
FIG. 1 is an architectural diagram of a hybrid power-driven system according to an embodiment of this application.

REFERENCE NUMERALS 1000, vehicle;
100, hybrid power-driven system;
1, motor; 101, output shaft of the motor;
2, engine;
3, power distribution mechanism; 301, motor power distribution shaft; 302, motor driving gear; 303, first gear; 304, input gear; 305, second gear; 306, first mode synchronizer; 307, second mode synchronizer; 308, idler gear; 309, idler gear shaft; 310, first/second mode synchronizer; 311, motor driven gear;

4, transmission mechanism; 401, clutch apparatus; 402, input shaft; 403, output shaft; 404, reverse gear shaft; 405, reverse gear driving gear; 406, reverse gear driven gear; 407, reverse gear middle gear; 408, output shaft middle gear; 409, first gear driving gear; 410, second gear driving gear; 411, third gear driving gear; 412, fourth gear driving gear; 413, fifth gear driving gear; 414, first gear driven gear; 415, second gear driven gear; 416, third gear driven gear; 417, fourth gear driven gear; 418, fifth gear driven gear; 419, 5/R gear synchronizer; 420, 1/3 gear synchronizer; 421, 2/4 gear synchronizer; 422, fifth gear synchronizer; 423, R gear synchronizer; 425, first middle gear; 426, reverse gear shaft synchronizer; 427, second middle gear; 428, 2/5 gear synchronizer; 429, 3/5 gear synchronizer;

5, main reducer; 501, main reducer driving gear; 502, main reducer driven gear; and 6, differential.

DETAILED DESCRIPTION

In this application, a first mode is that power of a motor is inputted to an input end of a transmission, and a second mode is that the power of the motor is inputted to an output end of the transmission.

In a hybrid power-driven system, in one manner, a motor is disposed between a clutch and a transmission. In this way, an axial size is increased, making the spatial arrangement of an assembly more difficult. In another manner, the clutch and the motor are integrated. In this way, the problem of an excessively large axial size can be resolved. However, in this case, a relatively high requirement is imposed on an integration process, leading to increased technical difficulty and higher processing costs.

In addition, power of the motor and an engine is transferred and outputted through the clutch, and the use load of the clutch is inevitably increased. In addition, during hybrid drive, restricted by the maximum input torque limitation of the clutch, the coupling torque between the engine and the motor needs to be limited, resulting in reduced power performance of a vehicle.

In the hybrid power-driven system, the motor is disposed on an output shaft of the transmission, wheels may be driven by using an independent pure electric path, and power of the motor does not pass through the clutch and is not limited by the input torque of the clutch. When power for driving a gear shift engine is disconnected, it may be implemented that the power of the motor is used to compensate for the power of the engine lost during gear shifting to continue to drive wheels, to keep smooth driving of the vehicle. However, due to the impact of spatial factors, to avoid parts such as a reverse gear shaft and the output shaft of the transmission, it is usually designed in a hybrid power transmission that a motor is connected to the transmission by an idler gear mechanism. In this way, with the presence of an idler gear, the transmission occupies a larger space, which adversely affects the spatial arrangement and lightweight of the entire vehicle. In addition, a transfer path from a motor end to a wheel end becomes longer, and as a result the transfer efficiency is reduced. In addition, power decoupling cannot be implemented between the motor and a main reducer. When the vehicle is stationary, the motor cannot operate. The vehicle cannot generate power during stop and wait, resulting in reduced and unbalanced battery power.

Therefore, the system is selectively switched between two operation modes, namely, a first mode and a second mode, so that different operation modes may be selected according to different requirement objectives, to provide the system with the characteristics of both the first mode and the second mode.

For example, in a hybrid power-driven system, a motor driving gear is coupled to a fifth gear driving gear by an idler gear. A first mode synchronizer is disposed on a first shaft, and a second mode synchronizer is disposed on a second shaft, to enable a vehicle to implement switching between the first mode and the second mode. However, the motor driving gear is coupled to the fifth gear driving gear by the idler gear. During operation in both the first mode and the second mode, a transmission path from the motor to a wheel end is relatively long. As a result, the transmission efficiency is relatively low during the driving of the motor. The motor driving gear is coupled to the fifth gear driving gear by the idler gear. During the output of the motor, the transmission path and an engine share speed ratios of a gear position gear, leading to difficulty in the speed ratio matching and gear design of gears of the motor end in the first mode, the second mode, and a power generation mode. Further, for driving in both the first mode and the second mode, the motor performs power transfer by using a fifth-gear gear of the transmission and the output shaft of the transmission. In consideration of the fifth-gear gear of an engine end and the utilization of the output shaft, the payload on the fifth-gear gear and the output shaft is greatly increased. As a result, higher requirements are imposed on the strength and service life of the fifth-gear gear and the output shaft, and processing costs are increased. In addition, the motor driving gear is coupled to the fifth gear driving gear by the idler gear, the motor end and the engine end share the same output shaft and output gear, the first mode synchronizer is disposed on the first shaft, and the second mode synchronizer is disposed on the second shaft, resulting in a relatively high degree of overlap between transmission paths of a motor end transmission part and a conventional transmission part. The two transmission parts cannot be independent of each other and affect each other. For example, when a user selects the second mode for hybrid power acceleration, during switching from the hybrid power fourth gear to a hybrid power fifth gear, the user cannot switch to the hybrid power fifth gear of the second mode. Instead, the user first needs to choose to switch to the first mode, to implement the hybrid power fifth gear. Further, when the battery power is slightly low for EV high-speed driving in the second mode and the user intends to switch to the hybrid electric fifth gear, the user also needs to first switch to the first mode, to implement switching to the hybrid power fifth gear for output. As a result, the control strategy of the system becomes complex and more difficult.

In addition, in the hybrid power-driven system, the motor end and the engine end share the same output shaft and output gear. The power torque of the output shaft has a high load, the output shaft needs to have higher strength, the service life of the output shaft is affected, the shaft diameter of the output shaft needs to be larger, the diameter and thickness of an output gear need to be larger, system costs are relatively high, the volume is relatively large, the weight is relatively heavy, and the overall vehicle performance is affected.

Figure 2:
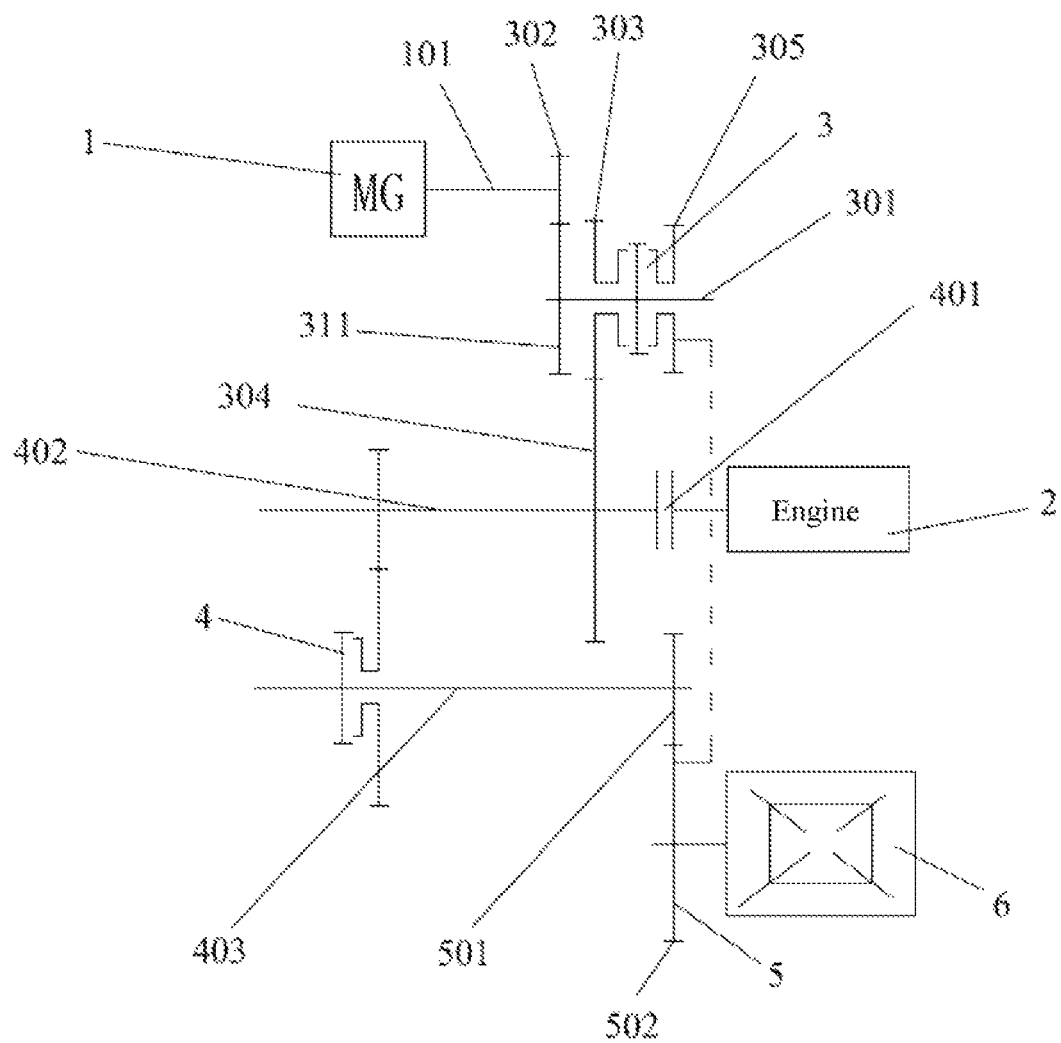
FIG. 2 is a brief structural diagram of a hybrid power-driven system according to an embodiment of this application.

As shown in FIG. 1 and FIG. 2, a hybrid power-driven system 100 according to an embodiment of this application includes an engine 2, a transmission, and a motor power apparatus. The transmission includes a transmission mechanism 4 and a main reducer 5. The motor power apparatus includes a motor 1 and a power distribution mechanism 3.

The transmission mechanism 4 includes a clutch apparatus 401, at least one input shaft 402, and at least one output shaft 403. At least one driving gear for forward gears is disposed on the input shaft 402. At least one driven gear for forward gears correspondingly meshed with the driving gear for forward gears is disposed on the output shaft 403. An input end of the clutch apparatus 401 is connected to a crankshaft of the engine 2. An output end of the clutch apparatus 401 is connected to the input shaft 402. The clutch apparatus 401 is selectively joined or disconnected to control power transmission and interruption between the engine 2 and the transmission mechanism 4. The output shaft 403 is connected to the main reducer to transmit power. The power distribution mechanism 3 receives power of the motor 1 and selectively performs direct transmission with the input shaft 402 of the transmission mechanism 4 or performs direct transmission with a main reducer driven gear 502 of the main reducer 5.

The clutch apparatus 401 is a single clutch, a dual clutch or another appropriate clutch, for example, a dry clutch or a wet clutch. A part such as a single-mass flywheel, a dual-mass flywheel or a torsional absorber may be disposed between the clutch apparatus 401 and the crankshaft of the engine 2.

The main reducer 5 includes a main reducer driving gear 501 and a main reducer driven gear 502 that are meshed with each other. The main reducer driving gear 501 is fixed on the output shaft 403. The main reducer driven gear 502 is integrated on a housing of a differential 6.

Herein, the "direct transmission" means that the power distribution mechanism 3 is directly coupled to the input shaft 402 or the main reducer driven gear 502 of the main reducer 5 to perform transmission without passing through any middle transmission part such as an idler gear apparatus, a middle shaft, or a middle gear. The advantage of direct transmission lies in that the middle transmission part is omitted, thereby reducing the loss of energy during transmission.

A manner of direct transmission between the power distribution mechanism 3 and the input shaft 402 of the transmission mechanism 4 includes a direct transmission manner such as a gear pair, a belt or a chain without using another middle transmission part. If the gear pair is used to perform direct transmission, one gear of the gear pair is located on the power distribution mechanism 3, and the other gear (an input gear 304 hereinafter) is located on the input shaft 402. A gear on the input shaft 402 may be an independently disposed gear or may be a gear position driving gear or a reverse gear driving gear on the input shaft 402. If a belt is used for direct transmission, one belt pulley is located on the power distribution mechanism 3, and the other belt pulley is located on the input shaft 402. If a chain is used for direct transmission, one sprocket is located on the power distribution mechanism 3, and the other sprocket is located on the input shaft 402.

Similarly, a manner of direct transmission between the power distribution mechanism 3 and the main reducer is a gear pair direct transmission manner without passing through another middle transmission part. One gear of the gear pair is located on the power distribution mechanism 3, and the other gear (the main reducer driven gear 502) is disposed on the main reducer 5.

As shown in FIG. 2, the power distribution mechanism 3 includes a motor power distribution shaft 301, a mode selection apparatus, a first transmission apparatus, and a second transmission apparatus. The motor power distribution shaft 301 is disposed independently from the transmission mechanism 4, and the motor power distribution shaft 301 is disposed independently from the motor 1. A motor driven gear 311 configured to receive the power of the motor 1 is disposed on the motor power distribution shaft 301. The first transmission apparatus includes a first gear 303 and an input gear 304. The first gear 303 is disposed on the motor power distribution shaft 301. The input gear 304 is disposed on the input shaft 402 of the transmission mechanism 4. The input gear 304 is directly meshed with the first gear 303. The second transmission apparatus includes a second gear 305. The second gear 305 is disposed on the motor power distribution shaft 301. The first gear 303 and the second gear 305 are coaxially disposed. The second gear 305 and the main reducer driven gear 502 of the main reducer 5 are directly meshed.

The mode selection apparatus selectively connects the motor 1 and the input shaft 402 of the transmission mechanism 4 or the motor 1 and the main reducer 5. In this way, the hybrid power-driven system is selectively switched between the first mode and the second mode by using the mode selection apparatus.

When the hybrid power-driven system is switched to the first mode by using the mode selection apparatus, the power distribution mechanism receives power of the motor and directly transfers the power of the motor to the input shaft of the transmission mechanism by using the first gear and the input gear. When the hybrid power-driven system is switched to the second mode by using the mode selection apparatus, the power distribution mechanism receives the power of the motor and directly transfers the power of the motor to the main reducer driven gear by using the motor power distribution shaft and the second gear.

Figure 3:
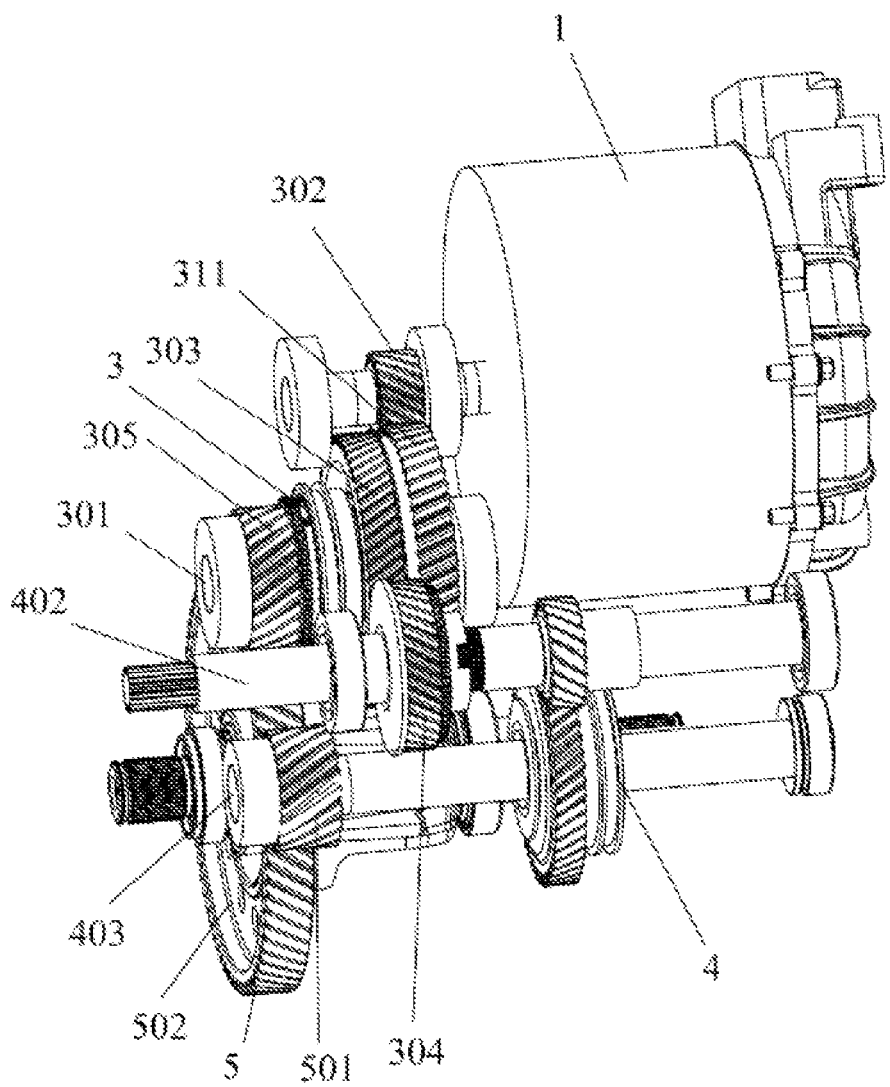
FIG. 3 is a perspective view of a three-dimensional model in FIG. 2.

FIG. 3 is a perspective view of a three-dimensional model in FIG. 2. It may be learned that the motor power distribution shaft 301 is relatively short, so that a compact arrangement of the motor power distribution shaft 301 and the motor 1 can be implemented, and the motor power distribution shaft can further be flexibly arranged according to different vehicle body platforms and different spaces.

In some embodiments, one gear position driving gear on the input shaft of the transmission mechanism is reused as the input gear. In this way, the axial space of the transmission mechanism can be shortened, to reduce the quantity of gears, to indirectly reduce the weight and reduce costs.

In some embodiments, the input gear is independently disposed on the input shaft of the transmission mechanism. Compared with that one gear position driving gear on the input shaft of the transmission mechanism is reused as the input gear, the control strategy is simpler, the service life and strength of the gear position gear needs to be lower, and processing costs are reduced.

In some embodiments, the mode selection apparatus is independently disposed at a position between the first gear and the second gear on the power distribution shaft, and the input gear is fixedly disposed on the input shaft of the transmission mechanism. In this way, the system costs can be reduced, and the process of manufacturing a mode selection apparatus is simplified.

In some embodiments, the mode selection apparatus includes two parts, a first part is disposed on the power distribution shaft, a second part is independently disposed on an input gear of the input shaft of the transmission mechanism, and the input gear is freely sleeved on the input shaft of the transmission mechanism. In this way, the axial space of the motor power distribution shaft can be shortened, to reserve the space for arranging the motor.

In some embodiments, the mode selection apparatus includes two parts, a first part is disposed on the power distribution shaft, a second part and a gear position synchronizer of the transmission mechanism are the same part, and the input gear is freely sleeved on the input shaft of the transmission mechanism. The second part and the gear position synchronizer of the transmission mechanism are the same part, so that the axial space of the input shaft can be shortened, and one gear position synchronizer is omitted.

In some embodiments, the motor driven gear and the first gear are respectively independently disposed. In this way, it is easier to implement speed ratio matching between an engine and a motor.

Figure 5:
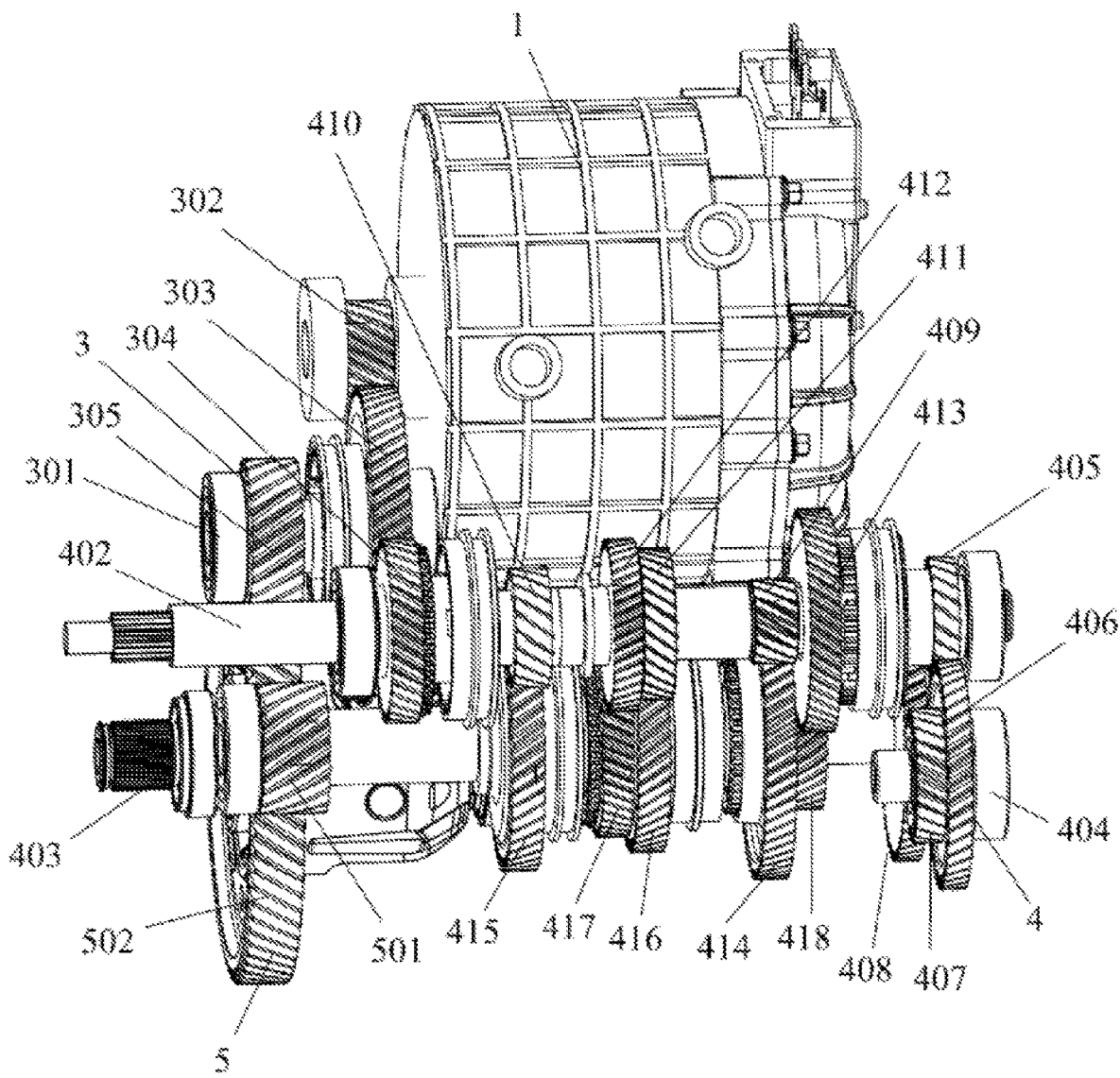
FIG. 5 is a perspective view of a three-dimensional model of the hybrid power-driven system according to the first embodiment of this application.

In some embodiments, the motor driven gear and the first gear are the same gear. As shown in FIG. 5, the motor driven gear and the first gear are the same gear, so that the length of the motor power distribution shaft can be reduced, and the axial space of the motor power distribution shaft is saved, to reserve the space for arranging the motor.

In some embodiments, the first gear is freely sleeved on the power distribution shaft, the second gear is freely sleeved on the power distribution shaft, and the input gear is fixed on the input shaft of the transmission mechanism.

In some embodiments, the first gear is freely sleeved on the power distribution shaft, the second gear is fixed on the power distribution shaft, and the input gear is freely sleeved on the input shaft of the transmission mechanism.

In some embodiments, the first gear is fixed on the power distribution shaft, the second gear is freely sleeved on the motor power distribution shaft, and the input gear is freely sleeved on the input shaft of the transmission mechanism.

For the hybrid power-driven system and the vehicle according to the embodiments of this application, a mode selection apparatus selectively connects a motor and an input shaft of a transmission mechanism or a motor and a main reducer, to enable the motor of the hybrid power-driven system to be switched between two modes for operation. A motor power distribution shaft is disposed independently from the transmission mechanism, and the motor power distribution shaft is disposed independently from the motor. The independently disposed power distribution shaft appropriately utilizes a radial space of the system. It is not necessary to make a significant change to a transmission mechanism of an original engine. A power distribution mechanism may independently transmit power of the motor to a wheel end (the main reducer) without passing through a transmission path of the transmission mechanism (that is, it is not necessary to depend on the input shaft and an output shaft of the transmission mechanism). Transmission paths of a motor end transmission part and a conventional transmission mechanism part have a relatively low degree of overlap (or do not overlap), thereby shortening a transmission path during driving of the motor. In this way, the control of the system is simpler, and efficient transmission of the motor is ensured. Both the transmission between the power distribution mechanism and the input shaft of the transmission mechanism and the transmission between the power distribution mechanism and a main reducer driven gear of the main reducer are direct transmission, so that while the hybrid power-driven system implements switching between two modes, a transmission path is minimized, thereby greatly improving the transmission efficiency of the system. The hybrid power-driven system may be applied to hybrid electric technologies such as dual-clutch and AMT.

In addition, the hybrid power-driven system and the vehicle in the embodiments of this application further have the following advantages:

(1) For a motor size under a conventional power requirement condition in the industry, a motor and an input gear cannot be directly meshed, an idler gear needs to be added to reserve a mounting space for the motor. In this application, a motor driven gear configured to receive power of the motor is disposed on a motor power distribution shaft, so that the problem of controlling and mounting the motor is resolved, high efficiency of transmission is further ensured, and in addition an axial space for an input shaft or an output shaft of a transmission mechanism is further reduced.

(2) The power distribution shaft shares a power torque of a second mode of the system, to implement power split of an engine and a motor. The power distribution shaft is used to directly split the power of the motor into an input shaft and a main reducer driven gear on a differential. Compared with a solution of outputting power from an output shaft, a strength requirement (for example, a shaft diameter) of an output shaft is reduced, and in addition a strength requirement (for example, the diameter and thickness of a gear) of a main reducer driving gear is reduced. The power distribution shaft is used to share the power torque of the second mode, so that the system has advantages such as low costs, a small volume, a light weight, a long service life, and adequate overall vehicle performance.

(3) The power distribution shaft may be relatively short, so that a compact arrangement of the power distribution shaft and the motor can be implemented, and the power distribution shaft can further be flexibly arranged according to different vehicle body platforms and different spaces.

(4) The independently disposed power distribution shaft appropriately utilizes a radial space of the system, switching between two modes can be implemented without using an input shaft or an output shaft, and in addition efficient transmission of the motor is ensured.

A plurality of embodiments of this application are described below in detail with reference to FIG. 4 to FIG. 19.

First Embodiment

Figure 4:
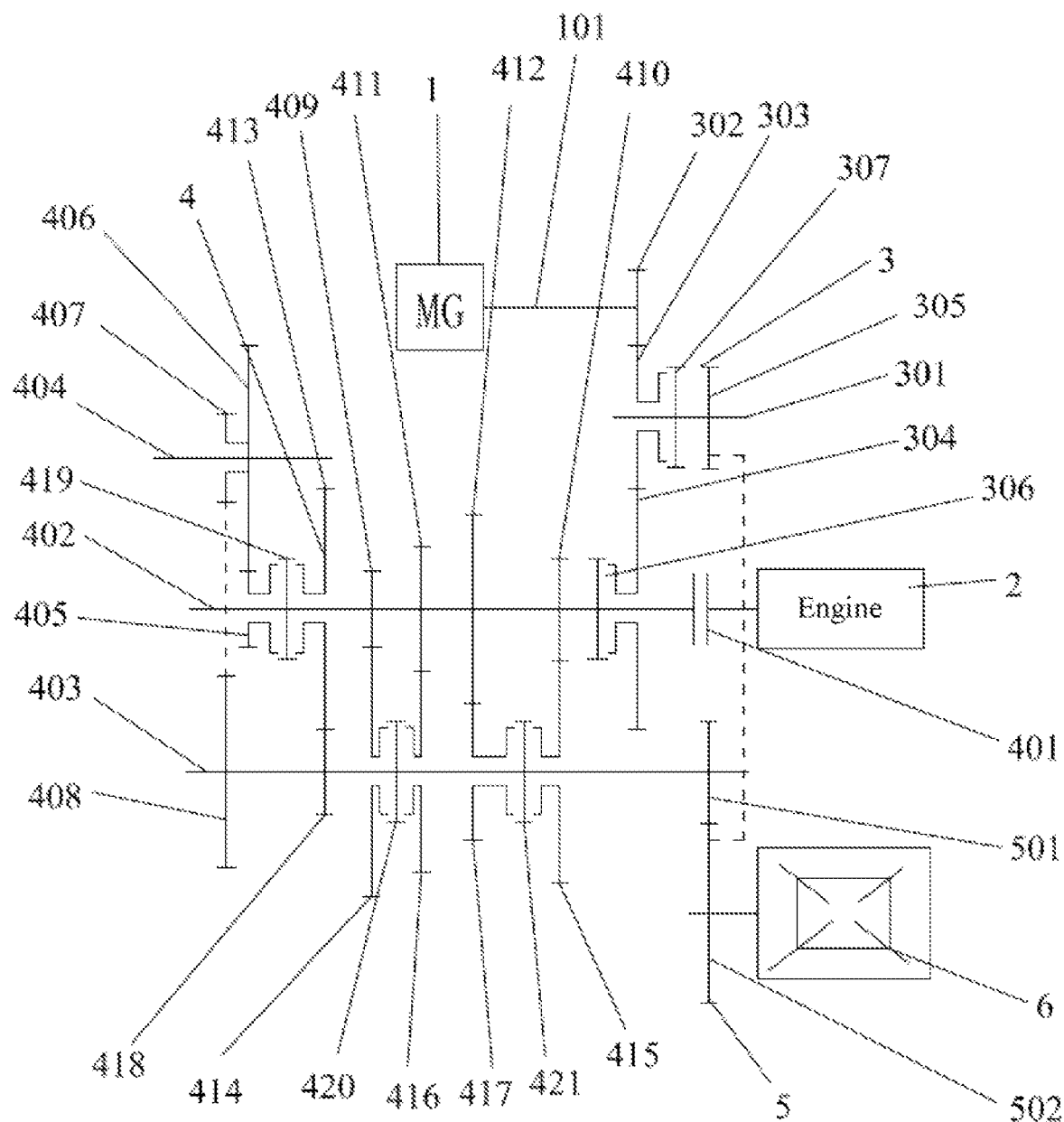
FIG. 4 is a brief structural diagram of a hybrid power-driven system according to a first embodiment of this application.
Figure 6:
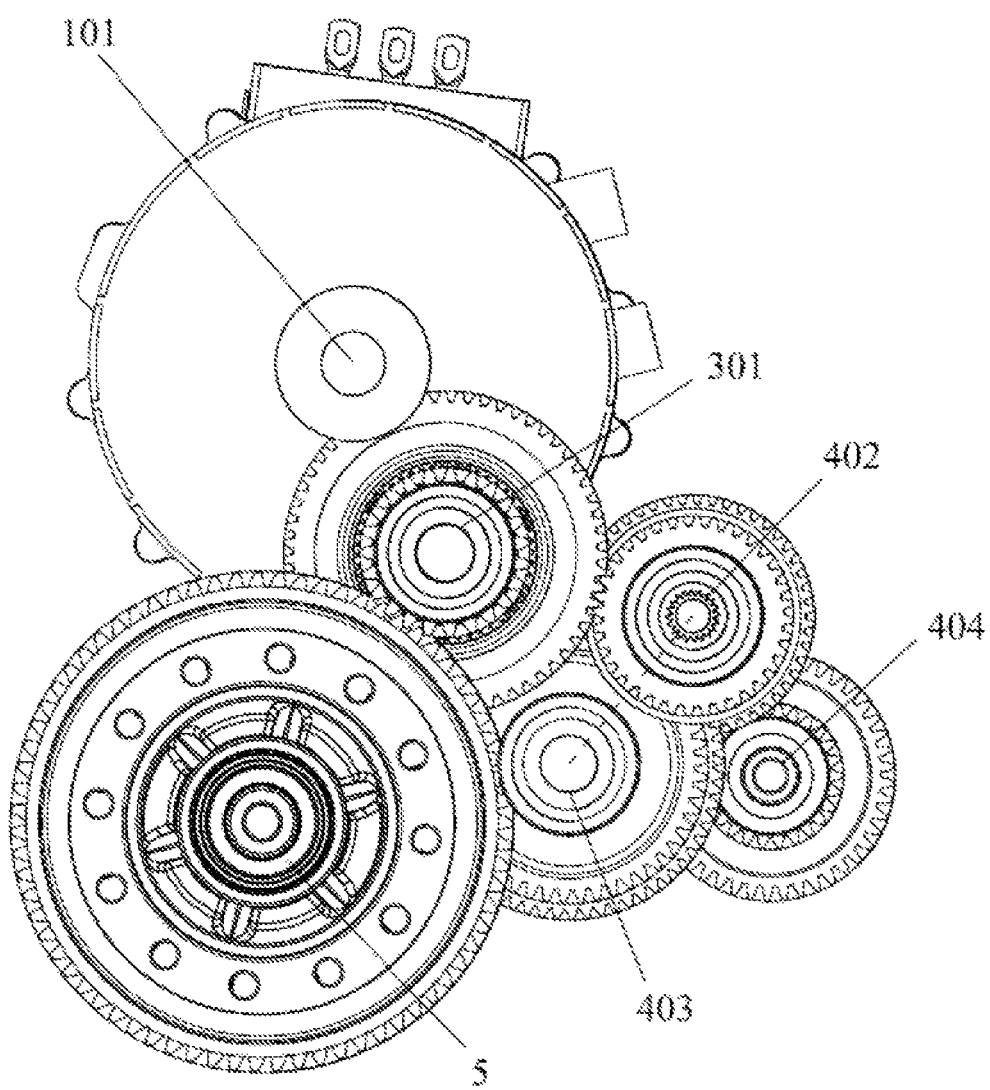
FIG. 6 is a side view of a three-dimensional model of the hybrid power-driven system according to the first embodiment of this application.

As shown in FIG. 4 to FIG. 6, a hybrid power-driven system 100 according to a first embodiment of this application includes an engine 2, a transmission, and a motor power apparatus. The transmission includes a transmission mechanism 4 and a main reducer 5. The motor power apparatus includes a motor 1 and a power distribution mechanism 3.

The main reducer 5 includes a main reducer driving gear 501 and a main reducer driven gear 502 that are meshed with each other. The main reducer driving gear 501 is fixed on the output shaft 403. The main reducer driven gear 502 is integrated on a housing of a differential 6.

In the first embodiment, the transmission mechanism 4 is a transmission mechanism of an AMT type.

The transmission mechanism 4 includes a clutch apparatus 401, an input shaft 402, and an output shaft 403. Five driving gears for forward gears, that is, a first gear driving gear 409, a second gear driving gear 410, a third gear driving gear 411, a fourth gear driving gear 412, and a fifth gear driving gear 413, are disposed on the input shaft 402. Five driven gears for forward gears, that is, a first gear driven gear 414, a second gear driven gear 415, a third gear driven gear 416, a fourth gear driven gear 417, and a fifth gear driven gear 418, that are correspondingly meshed with the driving gear for forward gears, are disposed on the output shaft 403. An input end of the clutch apparatus 401 is connected to a crankshaft of the engine 2. An output end of the clutch apparatus 401 is connected to the input shaft 402. The clutch apparatus 401 is selectively joined or disconnected to control power transmission and interruption between the engine 2 and the transmission mechanism 4. The output shaft 403 is connected to the main reducer 5 to transmit power.

The power distribution mechanism 3 includes a motor power distribution shaft 301, a mode selection apparatus, a first transmission apparatus, and a second transmission apparatus. The motor power distribution shaft 301 is disposed independently from the transmission mechanism 4. The motor power distribution shaft 301 is disposed independently from the motor 1. A motor driven gear configured to receive the power of the motor 1 is disposed on the motor power distribution shaft 301.

The first transmission apparatus is connected between the motor power distribution shaft 301 and the input shaft 402 of the transmission mechanism, and is configured to perform power transmission between the motor power distribution shaft 301 and the input shaft 402 of the transmission mechanism. The first transmission apparatus includes a first gear 303 and an input gear 304. The first gear 303 is freely sleeved on the motor power distribution shaft 301. The input gear 304 is freely sleeved on the input shaft 402 of the transmission mechanism 4. The input gear 304 is directly meshed with the first gear 303.

The second transmission apparatus is connected between the main reducer driven gear 502 and the motor power distribution shaft 301, and is configured to perform power transmission between the main reducer driven gear 502 and the motor power distribution shaft 301. The second transmission apparatus includes a second gear 305. The second gear 305 is fixed on the motor power distribution shaft 301. The first gear 303 and the second gear 305 are coaxially disposed. The second gear 305 and the main reducer driven gear 502 of the main reducer 5 are directly meshed.

In the first embodiment, the motor driven gear and the first gear 303 are the same gear. That is, the first gear 303 in FIG. 4 is at the same time used as a motor driven gear.

The power distribution mechanism 3 further includes a motor driving gear 302 fixed on the output shaft 101 of the motor 1. The first gear 303 is directly meshed with the motor driving gear 302.

The mode selection apparatus selectively connects the motor 1 and the input shaft 402 of the transmission mechanism 4 or the motor 1 and the main reducer 5.

The mode selection apparatus includes a first mode synchronizer 306 disposed on the input shaft 402 of the transmission mechanism 4 and a second mode synchronizer 307 disposed on the motor power distribution shaft 301. The first mode synchronizer 306 is selectively joined to or disconnected from the input gear 304. The second mode synchronizer 307 is selectively joined to or disconnected from the first gear 303. The first mode synchronizer 306 is independently disposed. By means of this solution, the axial size of the motor power distribution shaft 301 is shortened, to better facilitate the spatial arrangement of the motor 1, and also further simplify the structure and control method of the power distribution mechanism 3, thereby reducing the quantity of gears and further reducing the manufacturing costs of the system.

When the first mode synchronizer 306 is joined to the input gear 304 and the second mode synchronizer 307 is disconnected from the first gear 303, the hybrid power-driven system 100 is switched to the first mode. When the first mode synchronizer 306 is disconnected from the input gear 304 and the second mode synchronizer 307 is joined to the first gear 303, the hybrid power-driven system 100 is switched to a second mode.

The transmission mechanism 4 further includes a reverse gear shaft 404, a reverse gear driving gear 405, a reverse gear driven gear 406, a reverse gear middle gear 407, and an output shaft middle gear 408. The reverse gear driving gear 405 is freely sleeved on the input shaft 402. The output shaft middle gear 408 is disposed on the output shaft 403. The reverse gear driven gear 406 and the reverse gear middle gear 407 are fixed on the reverse gear shaft 404. The reverse gear driving gear 405 is meshed with the reverse gear driven gear 406. The reverse gear middle gear 407 is meshed with the output shaft middle gear 408.

The reverse gear driving gear 405 and the fifth gear driving gear 413 are freely sleeved on the input shaft 402. The first gear driving gear 409, the second gear driving gear 410, the third gear driving gear 411, and the fourth gear driving gear 412 are fixed on the input shaft 402. The first gear driven gear 414, the second gear driven gear 415, the third gear driven gear 416, and the fourth gear driven gear 417 are freely sleeved on the output shaft 403. The fifth gear driven gear 418 is fixed on the output shaft 403. The output shaft middle gear 408 is fixed on the output shaft 403. The first gear driving gear 409 is meshed with the first gear driven gear 414. The second gear driving gear 410 is meshed with the second gear driven gear 415. The third gear driving gear 411 is meshed with the third gear driven gear 416. The fourth gear driving gear 412 is meshed with the fourth gear driven gear 417. The fifth gear driving gear 413 is meshed with the fifth gear driven gear 418.

A 5/R gear synchronizer 419 located between the fifth gear driving gear 413 and the reverse gear driving gear 405 is disposed on the input shaft 402. The 5/R gear synchronizer 419 is selectively joined to or disconnected from the fifth gear driving gear 413 and the reverse gear driving gear 405.

A 1/3 gear synchronizer 420 located between the first gear driven gear 414 and the third gear driven gear 416 and a 2/4 gear synchronizer 421 located between the second gear driven gear 415 and the fourth gear driven gear 417 are disposed on the output shaft 403. The 1/3 gear synchronizer 420 is selectively joined to or disconnected from the first gear driven gear 414 and the third gear driven gear 416. The 2/4 gear synchronizer 421 is selectively joined to or disconnected from the second gear driven gear 415 and the fourth gear driven gear 417.

Preferably, the input gear 304, the second gear driving gear 410, the fourth gear driving gear 412, the third gear driving gear 411, the first gear driving gear 409, the fifth gear driving gear 413, and the reverse gear driving gear 405 are sequentially arranged along an axis of the input shaft 402 in a direction away from the engine 2. The main reducer driving gear 501, the second gear driven gear 415, the fourth gear driven gear 417, the third gear driven gear 416, the first gear driven gear 414, the fifth gear driven gear 418, and the output shaft middle gear 408 are sequentially arranged along an axis of the output shaft 403 in a direction away from the engine 2.

The engine 2 and the input shaft 402 are coaxially arranged.

FIG. 5 is a perspective view of a three-dimensional model in FIG. 4. It may be learned that the motor power distribution shaft 301 is relatively short, so that a compact arrangement of the motor power distribution shaft 301 and the motor 1 can be implemented, and the motor power distribution shaft can further be flexibly arranged according to different vehicle body platforms and different spaces.

As shown in FIG. 6, the output shaft 101 of the motor 1, the motor power distribution shaft 301, and an axis of the main reducer 5 are spatially arranged in a triangle. That is, the output shaft 101 of the motor 1, the motor power distribution shaft 301, and the radial center of the main reducer 5 are arranged at a particular angle, but are not distributed on the same straight line, which is beneficial to reduce the height of the system, to further reduce the size of the system, making the system more spatially compact.

The reverse gear shaft 404, the reverse gear driving gear 405, and the reverse gear middle gear 407 are placed at a tail end away from the transmission mechanism 4 of the engine 2. The reverse gear shaft is arranged in parallel at an interval from the input shaft 402 and the output shaft 403. The reverse gear shaft and the output shaft 101 of the motor 1 are located on two sides of a plane formed by the axis of the input shaft 402 and the axis of the output shaft 403. In addition, the reverse gear driving gear 405 and the reverse gear middle gear 407 may be made into a double-gear block to minimize the reverse gear shaft. In addition, the motor 1 may be placed between the reverse gear shaft 404 and the power distribution mechanism 3, to make the system more spatially compact.

In the first embodiment, it is selected to distribute the reverse gear shaft 404 and the output shaft 101 of the motor 1 on two sides of the plane formed by the axis of the input shaft 402 and the axis of the output shaft 403, to prevent the motor 1 from interfering with gears on the reverse gear shaft 404 and the reverse gear shaft 404. In this way, in the hybrid power-driven system 100 in the first embodiment, the problem of the spatial arrangement of the motor 1 can be resolved without adding an idler gear, thereby improving the transmission efficiency of a motor end. In addition, an electrohydraulic module usually further needs to be arranged on a side of the reverse gear shaft 404. If the reverse gear shaft 404 is located at the middle position of the transmission mechanism 4, the electrohydraulic module cannot be arranged. Therefore, to avoid the electrohydraulic module, it is selected to shorten the reverse gear shaft 404, two gears on the reverse gear shaft 404 are made into a double-gear block to minimize the reverse gear shaft, and the reverse gear shaft 404, the reverse gear driving gear 405, and the reverse gear middle gear 407 are disposed at a tail end away from the transmission mechanism 4 of the engine 2. In this way, a sufficient space may be reserved between the reverse gear shaft 404 and the engine 2 to arrange the electrohydraulic module, thereby utilizing the efficient space of the transmission mechanism 4 to the greatest extent, to make the system more spatially compact in the axial direction.

The transmission mechanism 4 and the power distribution mechanism 3 are independent of each other. That is, the motor power distribution shaft 301 is disposed independently from the transmission mechanism 4, and the motor power distribution shaft 301 is disposed independently from the motor 1. No significant change is made to the transmission mechanism 4 of the original engine 2. The power distribution mechanism 3 may independently transmit the power of the motor 1 to a wheel end (a main reducer) without passing through a transmission path of the transmission mechanism 4. Transmission paths of a motor end transmission part and a part of the conventional transmission mechanism 4 have a relatively low degree of overlap (or do not overlap), thereby shortening transmission paths of the motor 1 during driving and power generation. In this way, the control of the system is simpler and more efficient.

In the first embodiment, when the second mode synchronizer 307 is joined to the first gear 303 and disconnected from the first mode synchronizer 306, the power of the motor 1 is transferred to the motor power distribution shaft 301 through the motor driving gear 302 and the first gear 303, and is then transferred to the main reducer 5 through the second gear 305 and the main reducer driven gear 502, to implement the output of the motor 1 in the second mode. Because the power distribution mechanism 3 and the main reducer driven gear 502 perform direct transmission, a transmission path at the end of the motor 1 in the second mode is very short, thereby greatly improving the transmission efficiency of the system. In the hybrid electric mode, the motor 1 works in the second mode. When power loss occurs during gear shifting of the engine 2 to cause stumbles in gear shifting, the motor 1 may compensate for power lost due to gear shifting of the engine 2, to resolve the problem of gear shifting stumbles during gear shifting of a conventional transmission, to make the gear shifting process smoother and improve driving experience.

In the first embodiment, when the second mode synchronizer 307 is disconnected and the first mode synchronizer 306 is joined to the input gear 304, there are several cases as follows:

(1) The engine 2 does not work, the clutch apparatus 401 is disconnected, the gear position synchronizer (the 1/3 gear synchronizer 420, the 2/4 gear synchronizer 421, and the 5/R gear synchronizer) of the transmission mechanism 4 performs a corresponding action, the motor 1 is used as the drive motor 1, the power of the motor 1 is outputted to the main reducer 5 through a first path (the motor driving gear 302-the first gear 303-the input gear 304) of the power distribution mechanism 3 and the gear position gears of the transmission mechanism 4, to implement a full-gear position pure electric output of the first mode. When the system is in the first mode, the motor 1 may implement full-gear position driving in place of the engine 2, the selection requirement of the motor 1 is also reduced.

(2) The engine 2 works, the clutch apparatus 401 is joined, the gear position synchronizer of the transmission mechanism 4 performs a corresponding action, the motor 1 is used as the drive motor 1, and the power of the motor 1 is coupled to the power of the engine 2 at the input shaft 402 through the first path of the power distribution mechanism 3. The power of the motor 1 is outputted to the main reducer 5 through the first path (the motor driving gear 302-the first gear 303-the input gear 304) of the power distribution mechanism 3 and the gear position gears of the transmission mechanism 4, to implement a full-gear position hybrid electric output of the first mode. The power of the motor 1 is coupled to the power of the engine 2, so that the driving force of the system can be increased, thereby improving the dynamic performance.

(3) The engine 2 works, the clutch apparatus 401 is joined, the gear position synchronizer does not act, the motor 1 is used as a power generator, and the power of the engine 2 may be transferred to the end of the motor 1 through the input gear 304, the first gear 303, and the motor driving gear 302, to implement a stationary power generation function. Gear transmission is used to implement stationary power generation with a speed increasing ratio, to further improve the efficiency of power generation. Through the selection of the mode selection apparatus of the power distribution mechanism 3, switching between the first mode and the second mode of the hybrid power system can be implemented, and different operation modes may be selected according to different requirement objectives of the overall vehicle, to implement "multiple modes in one vehicle", to provide more varied functionalities of the vehicle.

When the motor 1 is in the second mode, because the clutch apparatus 401 is disconnected during gear shifting, the power of the engine 2 is lost to cause a change in the acceleration of the vehicle, resulting in gear shift stumbles. It is necessary to compensate for the power of the engine 2 lost during gear shifting to remedy the problem, gear shifting torque compensation strategy is specially added. The gear shifting torque compensation strategy is that in the case of simultaneous driving of the engine 2 and the motor 1, the torque of the motor 1 is limited. However, in the case that the clutch apparatus 401 is disconnected, the torque of the motor 1 is not limited, to compensate for the torque required for driving, to implement smoother gear shifting.

When the motor 1 produces a hybrid electric output in the first mode, the motor 1 may produce a power output by using by using all mechanical gear positions of the transmission mechanism 4. The motor 1 uses the joint of the first mode synchronizer 306 to enable the mechanical gear positions to participate in driving. During gear shifting, the motor 1 needs to unload and load torque. After the gear position is joined, because the torque of the engine 2 rises relatively slowly, the motor 1 performs torque compensation. During gear shifting, through fast gear shifting and beforehand output of the motor 1, the perception of power decrease can be reduced.

Due to the limitation of conditions, sometimes the vehicle may have excessively low power but external charging is not available. To resolve the power problem, in the HEV mode, during power shortage, the first mode synchronizer 306 is joined and the clutch apparatus 401 is joined to enable the engine 2 to drive the motor 1 to keep the motor 1 in a power generation state, so as to charge the power battery. During power generation, the target rotation speed of the engine and the net torque of the engine are determined according to an overall vehicle power requirement and an NVH state.

For the hybrid power-driven system 100 in the first embodiment, through selective joint of the clutch apparatus 401 and synchronizers (the first mode synchronizer 306, the second mode synchronizer 307, and various gear position synchronizers), so that the following output modes can be implemented:

(1) Pure Fuel Mode

To implement the power output of five gear positions of a pure fuel mode, left-right movement relationships of shifting yokes of various gear position synchronizers of the transmission mechanism at various gear positions are shown in the following Table 1 (the left-right herein is only the left-right direction in the figure, and does not limit the positions during actual work. This is the same hereinafter):

TABLE 1

| Gear position | 2/4 gear synchronizer | | 1/3 gear synchronizer | | 5/R gear synchronizer | |
|---|---|---|---|---|---|---|
| | Left | Right | Left | Right | Left | Right |
| First gear | | | | ● | | |
| Second gear | | | ● | | | |
| Third gear | | | | ● | | |
| Fourth gear | ● | | | | | |
| Fifth gear | | | | | | ● |
| R gear | | | | | ● | |

(2) Second Mode

When the second mode synchronizer 307 is joined to the first gear 303 and disconnected from the first mode synchronizer 306, the motor 1 is in the second mode. There are several working conditions as follows:

1. Pure electric output: The engine 2 does not work, the clutch apparatus 401 is disconnected, the motor 1 is started as the drive motor 1 to transfer power to the motor power distribution shaft 301 through the motor driving gear 302 and the first gear 303, and then transfers the power to the main reducer 5 through the second gear 305 and the main reducer driven gear 502, to implement the pure electric output of the motor 1.

2. Hybrid power output: During the driving of the engine 2, the motor 1 is started, so that the power of the motor 1 can be engaged, to implement outputs of various gear position gears of hybrid power. The actions of the gear position synchronizers are shown in the following Table 2:

TABLE 2

| Gear position | Second mode synchronizer | | 2/4 gear synchronizer | | 1/3 gear synchronizer | | 5/R gear synchronizer | |
|---|---|---|---|---|---|---|---|---|
| | Left | Right | Left | Right | Left | Right | Left | Right |
| First gear | ● | | | | | ● | | |
| Second gear | ● | | | | ● | | | |
| Third gear | ● | | | | | ● | | |
| Fourth gear | ● | | ● | | | | | |
| Fifth gear | ● | | | | | | | ● |
| R gear | ● | | | | | | ● | |

3. Mobile power generation: In a driving process, the second mode synchronizer 307 is joined to the first gear 303, the motor 1 is used as a power generator, and while the power of the engine 2 is outputted through wheels, a part of the power is transferred to the motor 1 through the power distribution mechanism 3, to implement mobile power generation.

4. Deceleration/Braking energy recovery: During deceleration or braking, the second mode synchronizer 307 is joined to the first gear 303, and energy is transferred from the wheels to the motor 1 through the power distribution mechanism 3, to implement kinetic energy recovery.

5. Stationary power generation: When the second mode synchronizer 307 is disconnected and the first mode synchronizer 306 is joined to the input gear 304, the engine 2 works, the clutch apparatus 401 is joined, the gear position synchronizers do not act, the motor 1 is used as a power generator, and the power of the engine 2 may be transferred to the end of the motor 1 through the input gear 304, the first gear 303, and the motor driving gear 302, to implement a stationary power generation function.

(3) First Mode

When the first mode synchronizer 306 is joined to the input gear 304 and the second mode synchronizer 307 is disconnected, the motor 1 produces an output in the first mode. There are several working conditions as follows:

1. Pure electric working condition: The engine 2 does not work, the clutch apparatus 401 is disconnected, the gear position synchronizers perform corresponding actions, the motor 1 is used as a drive motor, and the power of the motor 1 is outputted to a main reducer by using the first path of the power distribution mechanism 3 and the gear position gears, to implement a full-gear position pure electric output of the first mode. The actions of the synchronizers are shown in the following Table 3:

TABLE 3

| Gear position | First mode synchronizer | | 2/4 gear synchronizer | | 1/3 gear synchronizer | | 5/R gear synchronizer | |
|---|---|---|---|---|---|---|---|---|
| | Left | Right | Left | Right | Left | Right | Left | Right |
| First gear | | ● | | | | ● | | |
| Second gear | | ● | | ● | | | | |
| Third gear | | ● | | | | ● | | |
| Fourth gear | | ● | ● | | | | | |
| Fifth gear | | ● | | | | | | ● |
| R gear | | ● | | | | ● | | |

2. Hybrid power output: During the output of the engine 2, the motor 1 is started, so that the power of the motor 1 can be engaged, to implement outputs of various gear position gears of hybrid power. The actions of the synchronizers are shown in the following Table 4:

TABLE 4

| Gear position | First mode synchronizer | | 2/4 gear synchronizer | | 1/3 gear synchronizer | | 5/R gear synchronizer | |
|---|---|---|---|---|---|---|---|---|
| | Left | Right | Left | Right | Left | Right | Left | Right |
| First gear | ● | | | | | ● | | |
| Second gear | ● | | | ● | | | | |
| Third gear | ● | | | | | ● | | |
| Fourth gear | ● | | ● | | | | | |
| Fifth gear | ● | | | | | | | ● |
| R gear | ● | | | | | | ● | |

3. Mobile power generation: In a driving process, the first mode synchronizer 306 is joined to the input gear 304, the motor 1 is used as a power generator, and while the power of the engine 2 is inputted through the input shaft 402, a part of the power is transferred to the motor 1 through the power distribution mechanism 3, to implement mobile power generation.

4. Deceleration/Braking energy recovery: During deceleration or braking, the first mode synchronizer 306 is joined to the input gear 304, and energy is transferred back to the motor 1, to implement kinetic energy recovery.

5. Stationary power generation: When the second mode synchronizer 307 is disconnected and the first mode synchronizer 306 is joined to the input gear 304, the engine 2 works, the clutch apparatus 401 is joined, the gear position synchronizers do not act, the motor 1 is used as a power generator, and the power of the engine 2 may be transferred to the end of the motor 1 through the input gear 304, the first gear 303, and the motor driving gear 302, to implement a stationary power generation function.

Second Embodiment

Figure 7:
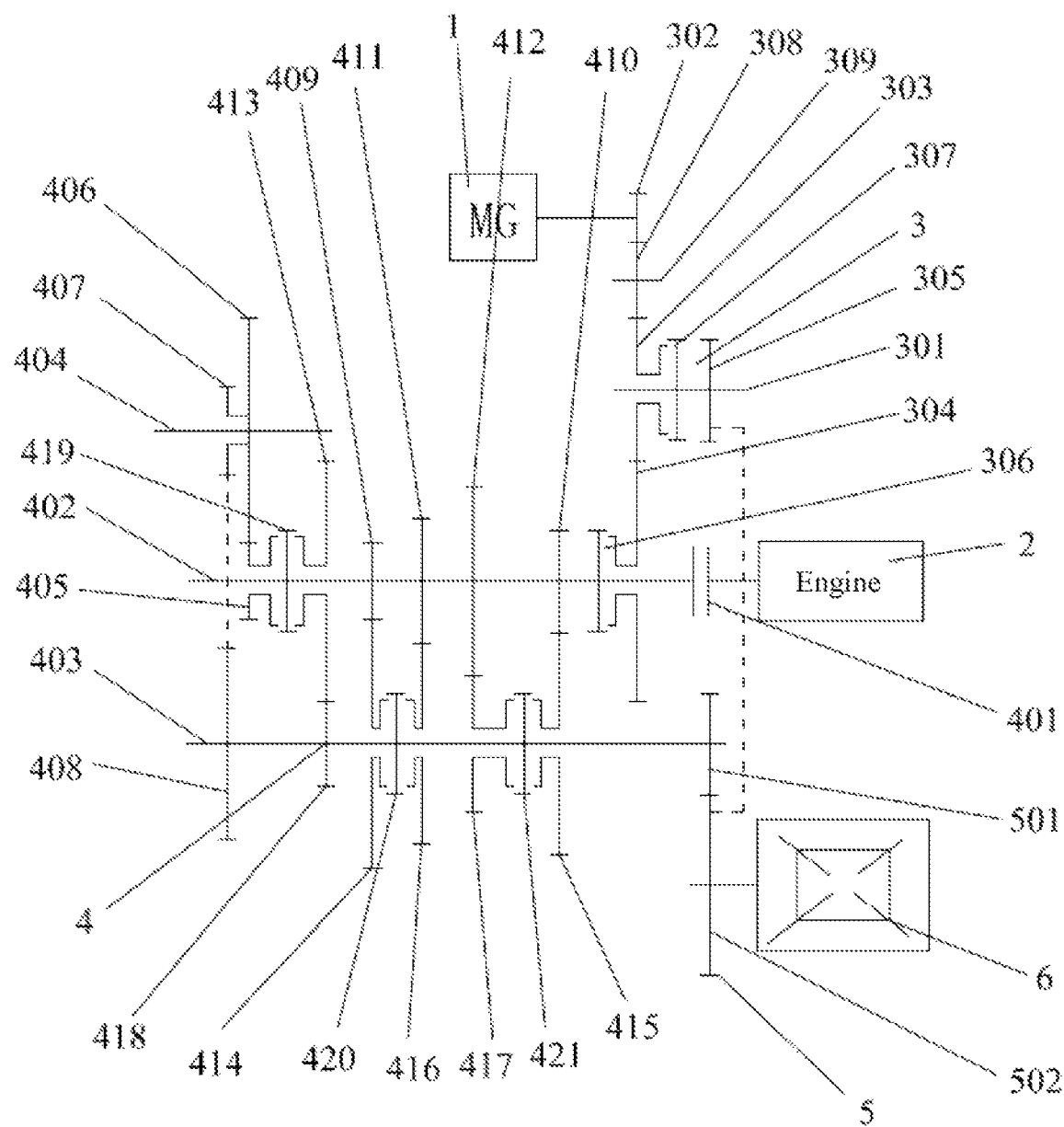
FIG. 7 is a brief structural diagram of a hybrid power-driven system according to a second embodiment of this application.

FIG. 7 shows a hybrid power-driven system 100 according to a second embodiment of this application. A difference from the first embodiment lies in that the structure of the first transmission apparatus is different. In the second embodiment, the first transmission apparatus includes a first gear 303 and an input gear 304. An idler gear 308 and an idler gear shaft 309 are added between the motor driving gear 302 and the first gear 303. The idler gear 308 is fixed on the idler gear shaft 309. The first gear 303 is freely sleeved on the motor power distribution shaft 301. The input gear 304 is freely sleeved on the input shaft 402. The first gear 303 is meshed with both the idler gear 308 and the input gear 304. The motor driving gear 302 is meshed with the idler gear 308. That is, the first gear 303 is meshed with the motor driving gear 302 by the idler gear 308.

Compared with the first embodiment, a mechanism of the idler gear 308 (the idler gear 308 and the idler gear shaft 309) is added between the first gear 303 and the motor driving gear 302 in the power distribution mechanism 3, to resolve the problem of the spatial arrangement of the large-size motor 1.

Third Embodiment

Figure 8:
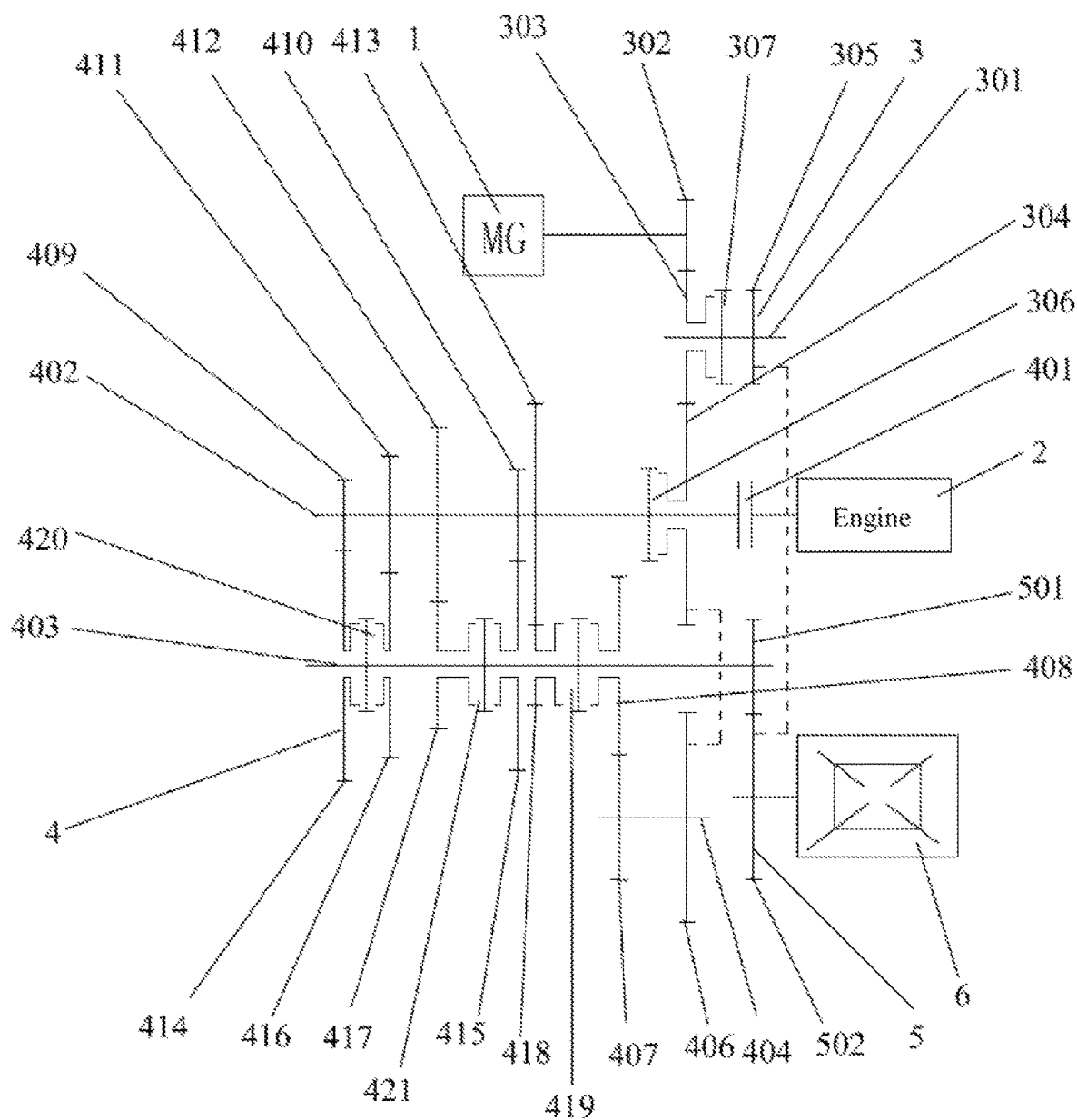
FIG. 8 is a brief structural diagram of a hybrid power-driven system according to a third embodiment of this application.

FIG. 8 shows a hybrid power-driven system 100 according to a third embodiment of this application. A difference from the first embodiment mainly lies in the gear arrangement of the transmission mechanism 4.

The reverse gear shaft 404 is not a double-gear block but is instead two independent gears (the reverse gear driven gear 406 and the reverse gear middle gear 407) fixedly connected to the reverse gear shaft 404.

In addition, the reverse gear driving gear is reused as the input gear 304. This solution can reduce the quantity of gears and shorten the axial space.

In addition, in the third embodiment, the first gear driving gear 409, the second gear driving gear 410, the third gear driving gear 411, the fourth gear driving gear 412, and the fifth gear driving gear 413 are fixed on the input shaft 402, and the first gear driven gear 414, the second gear driven gear 415, the third gear driven gear 416, the fourth gear driven gear 417, and the fifth gear driven gear 418 are freely sleeved on the output shaft 403.

A 1/3 gear synchronizer 420 located between the first gear driven gear 414 and the third gear driven gear 416, a 2/4 gear synchronizer 421 located between the second gear driven gear 415 and the fourth gear driven gear 417, and a 5/R gear synchronizer 419 located between the fifth gear driven gear 418 and the output shaft middle gear 408 are disposed on the output shaft 403. The 1/3 gear synchronizer 420 is selectively joined to or disconnected from the first gear driven gear 414 and the third gear driven gear 416. The 2/4 gear synchronizer 421 is selectively joined to or disconnected from the second gear driven gear 415 and the fourth gear driven gear 417. The 5/R gear synchronizer 419 is selectively joined to or disconnected from the fifth gear driven gear 418 and the output shaft middle gear 408.

The input gear 304, the fifth gear driving gear 413, the second gear driving gear 410, the fourth gear driving gear 412, the third gear driving gear 411, and the first gear driving gear 409 are sequentially arranged along an axis of the input shaft 402 in a direction away from the engine 2. The main reducer driving gear 501, the output shaft middle gear 408, the fifth gear driven gear 418, the second gear driven gear 415, the fourth gear driven gear 417, the third gear driven gear 416, and the first gear driven gear 414 are sequentially arranged along an axis of the output shaft 403 in a direction away from the engine 2.

Fourth Embodiment

Figure 9:
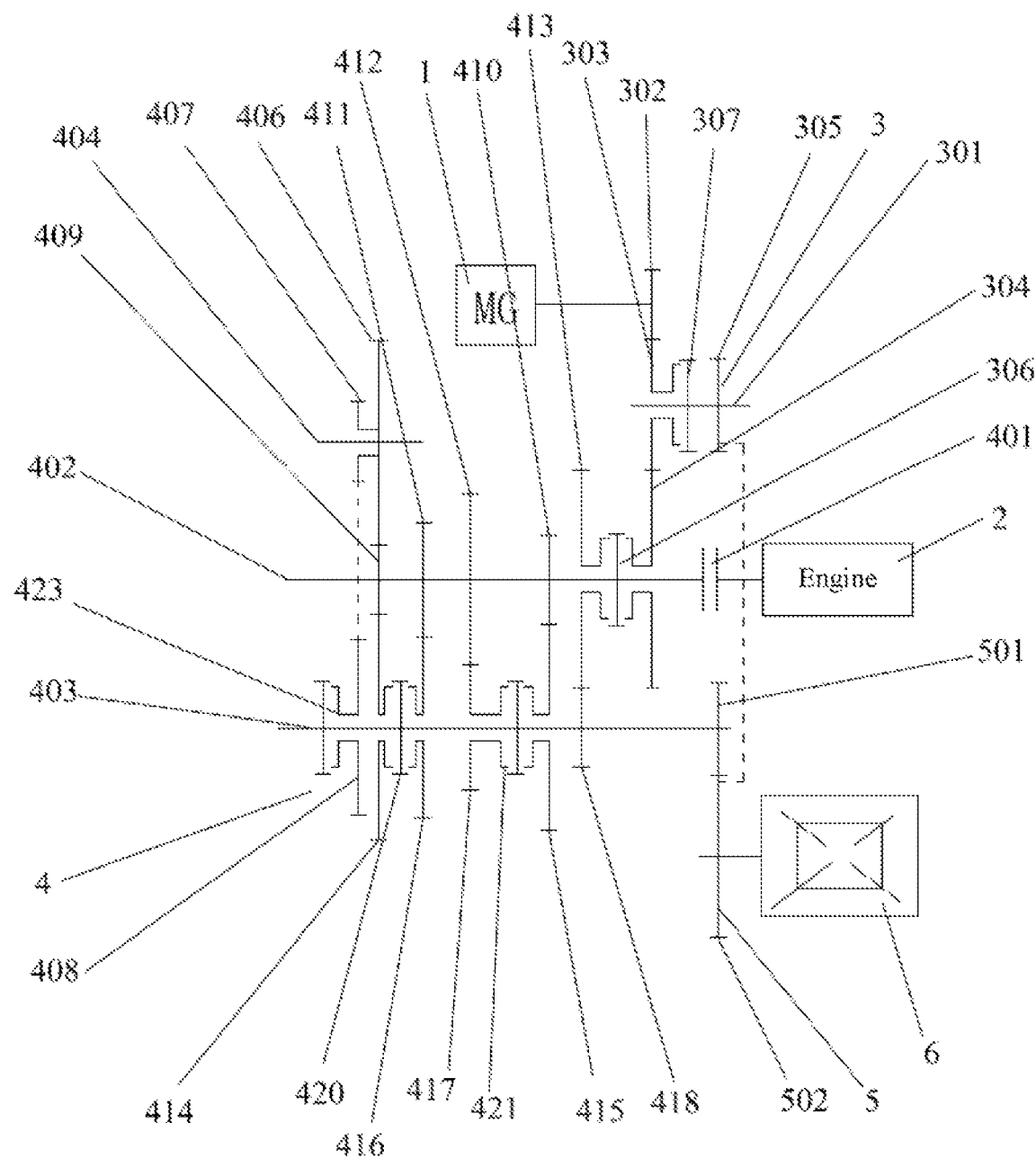
FIG. 9 is a brief structural diagram of a hybrid power-driven system according to a fourth embodiment of this application.

FIG. 9 shows a hybrid power-driven system 100 according to a fourth embodiment of this application. A difference between the fourth embodiment and the first embodiment mainly lies in that the transmission mechanism 4 has another gear arrangement form.

The reverse gear shaft 404, the reverse gear driven gear 406, and the reverse gear middle gear 407 are located at a distal end of the transmission mechanism 4 as a whole. The reverse gear driving gear 405 and the first gear driving gear 409 are the same gear. An independent synchronizer, namely, an R gear synchronizer 423, is used for the reverse gear. The R gear synchronizer 423 is located on an axial side of the output shaft middle gear 408. The R gear synchronizer 423 is selectively joined to or disconnected from the output shaft middle gear 408.

The fifth gear driving gear 413 and the input gear 304 share one synchronizer. The first mode synchronizer 306 and a fifth gear synchronizer of the transmission mechanism are the same synchronizer. The first mode synchronizer 306 is disposed between the input gear 304 and the fifth gear driving gear 413. The first mode synchronizer 306 is selectively joined to or disconnected from the input gear 304 and the fifth gear driving gear 413. This solution can reduce the quantity of synchronizers and shorten the axial space of the system.

Fifth Embodiment

Figure 10:
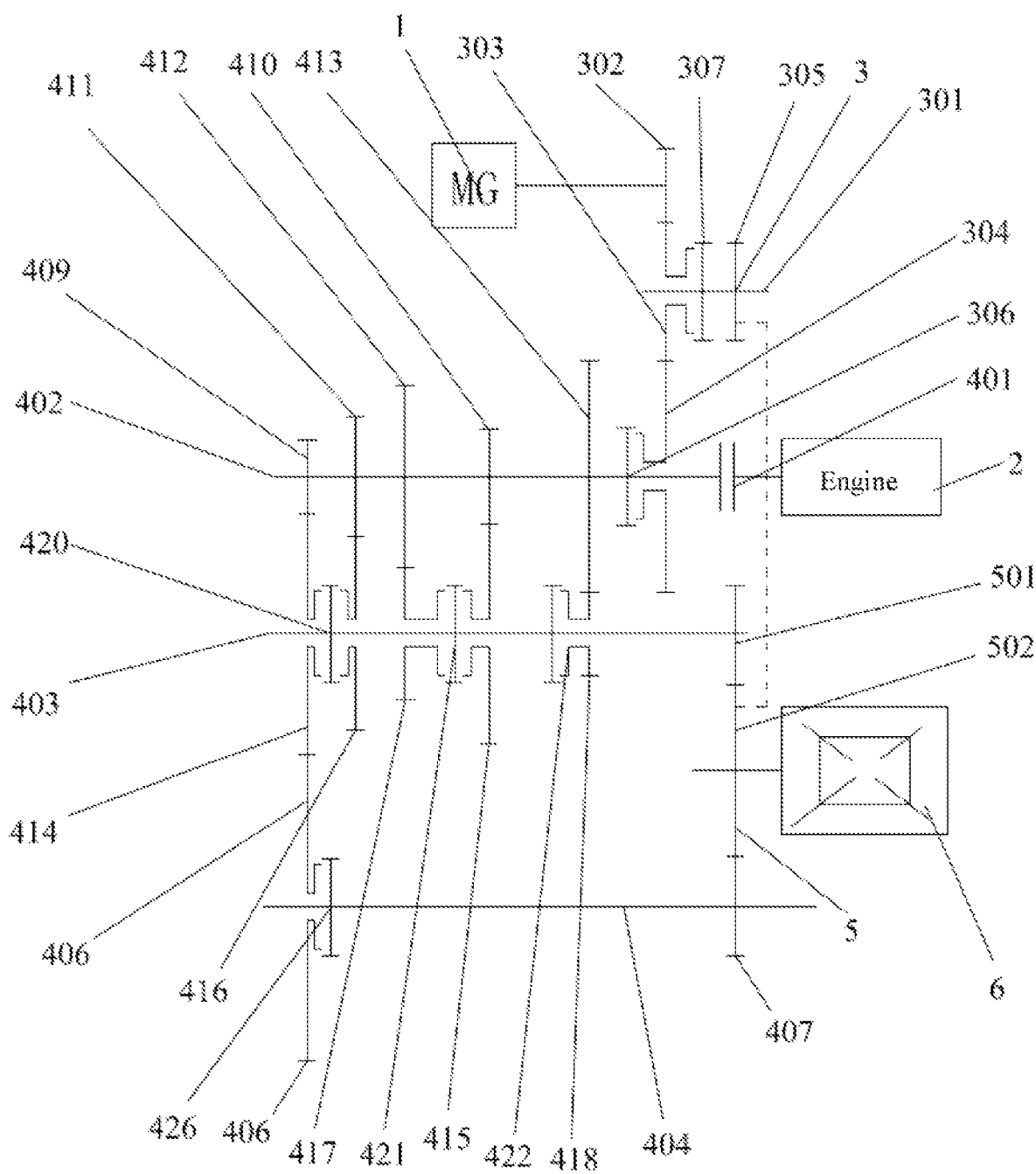
FIG. 10 is a brief structural diagram of a hybrid power-driven system according to a fifth embodiment of this application.

FIG. 10 shows a hybrid power-driven system 100 according to a fifth embodiment of this application. A difference between the fifth embodiment and the third embodiment mainly lies in that the transmission mechanism 4 has another gear arrangement form.

The transmission mechanism 4 further includes a reverse gear shaft 404, a reverse gear driven gear 406, a reverse gear middle gear 407, and a reverse gear shaft synchronizer 426. The reverse gear driven gear 406 is freely sleeved on the reverse gear shaft 404. The reverse gear middle gear 407 is fixed on the reverse gear shaft 404. The reverse gear middle gear 407 is meshed with the main reducer driven gear 502 of the main reducer 5. The reverse gear shaft synchronizer 426 is selectively joined to or disconnected from the reverse gear driven gear 406. One driven gear for forward gears is meshed with the reverse gear driven gear 406. That is, the first gear driven gear 414 is meshed with the reverse gear driven gear 406.

Another difference lies in that one synchronizer (a fifth gear synchronizer 422) is separately used for the fifth-gear gear. That is, a 1/3 gear synchronizer 420 located between the first gear driven gear 414 and the third gear driven gear 416, a 2/4 gear synchronizer 421 located between the second gear driven gear 415 and the fourth gear driven gear 417, and a fifth gear synchronizer 422 located on an axial side of the fifth gear driven gear 418 are disposed on the output shaft 403. The fifth gear synchronizer 422 is selectively joined to or disconnected from the fifth gear driven gear 418. The 1/3 gear synchronizer 420 is selectively joined to or disconnected from the first gear driven gear 414 and the third gear driven gear 416. The 2/4 gear synchronizer 421 is selectively joined to or disconnected from the second gear driven gear 415 and the fourth gear driven gear 417.

The first gear driven gear is meshed with the reverse gear driven gear 406. The reverse gear middle gear 407 is meshed with the main reducer driven gear 502. This solution can reduce the quantity of gears and shorten the axial space.

Sixth Embodiment

Figure 11:
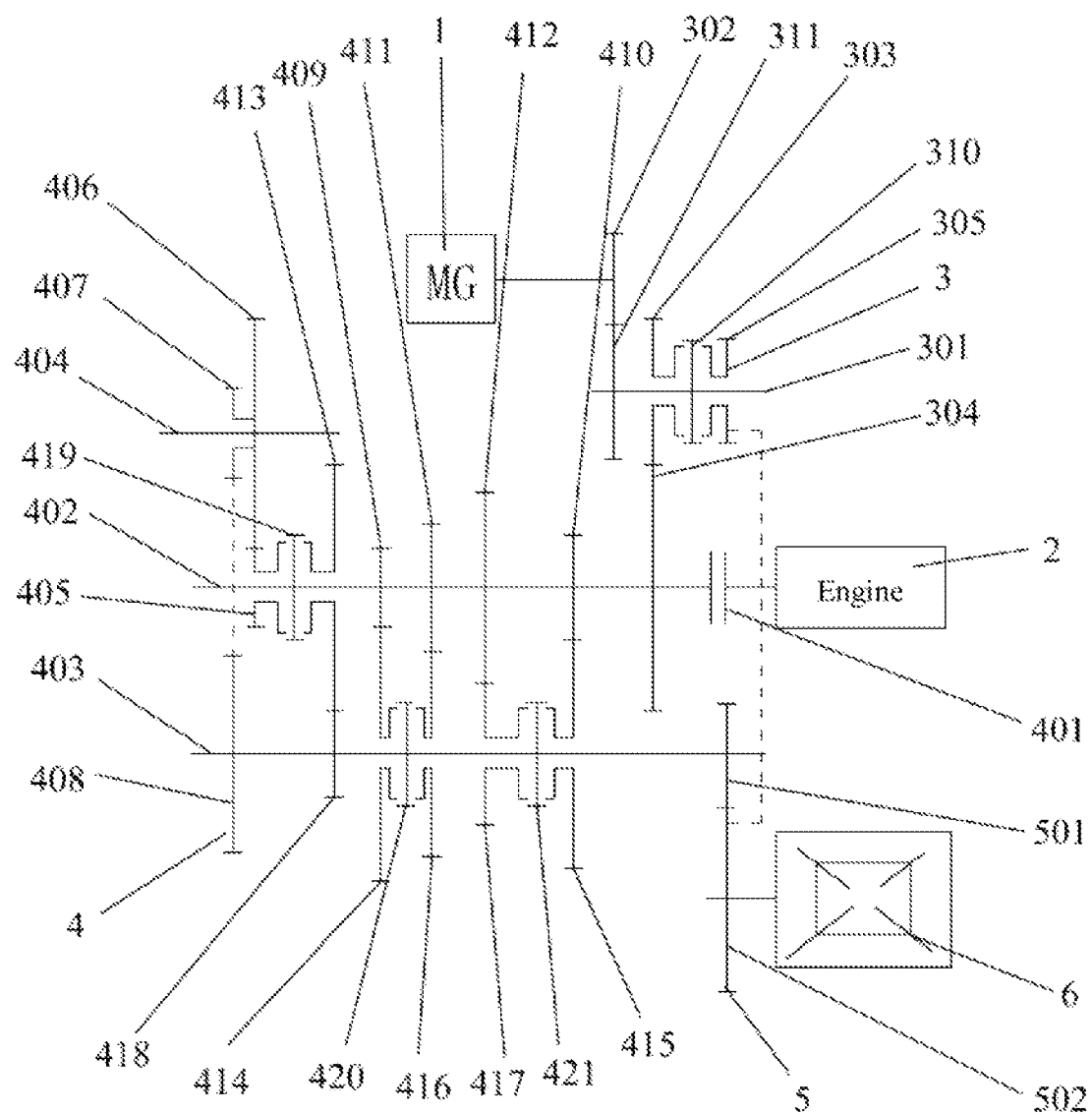
FIG. 11 is a brief structural diagram of a hybrid power-driven system according to a sixth embodiment of this application.

FIG. 11 shows a hybrid power-driven system 100 according to a sixth embodiment of this application. A difference between the sixth embodiment and the first embodiment mainly lies in that the power distribution mechanism 3 of the motor 1 has another form.

That is, the motor driven gear 311 and the first gear 303 are respectively independently disposed. The first transmission apparatus includes a first gear 303 and an input gear 304. The motor driving gear 302 is fixed on the output shaft 101 of the motor 1. The motor driven gear 311 is fixed on the motor power distribution shaft 301. The first gear 303 and the second gear 305 are freely sleeved on the motor power distribution shaft 301. The input gear 304 is fixed on the input shaft 402. The first gear 303 is meshed with the input gear 304. The second transmission apparatus includes a second gear 305. The second gear 305 is freely sleeved on the motor power distribution shaft 301. The second gear 305 is meshed with the main reducer driven gear 502.

The mode selection apparatus includes a first/second mode synchronizer 310 disposed on the motor power distribution shaft 301. The first/second mode synchronizer 310 is located between the first gear 303 and the second gear 305. The first/second mode synchronizer 310 is selectively joined to or disconnected from the first gear 303 and the second gear 305.

When the first/second mode synchronizer 310 is joined to the first gear 303, the hybrid power-driven system 100 is switched to the first mode. When the first/second mode synchronizer 310 is joined to the second gear 305, the hybrid power-driven system 100 is switched to a second mode.

Compared with the first embodiment, the first mode synchronizer 306 and the second mode synchronizer 307 are combined into one synchronizer, to reduce the use of synchronizers, thereby reducing the system costs and control difficulty.

Seventh Embodiment

Figure 12:
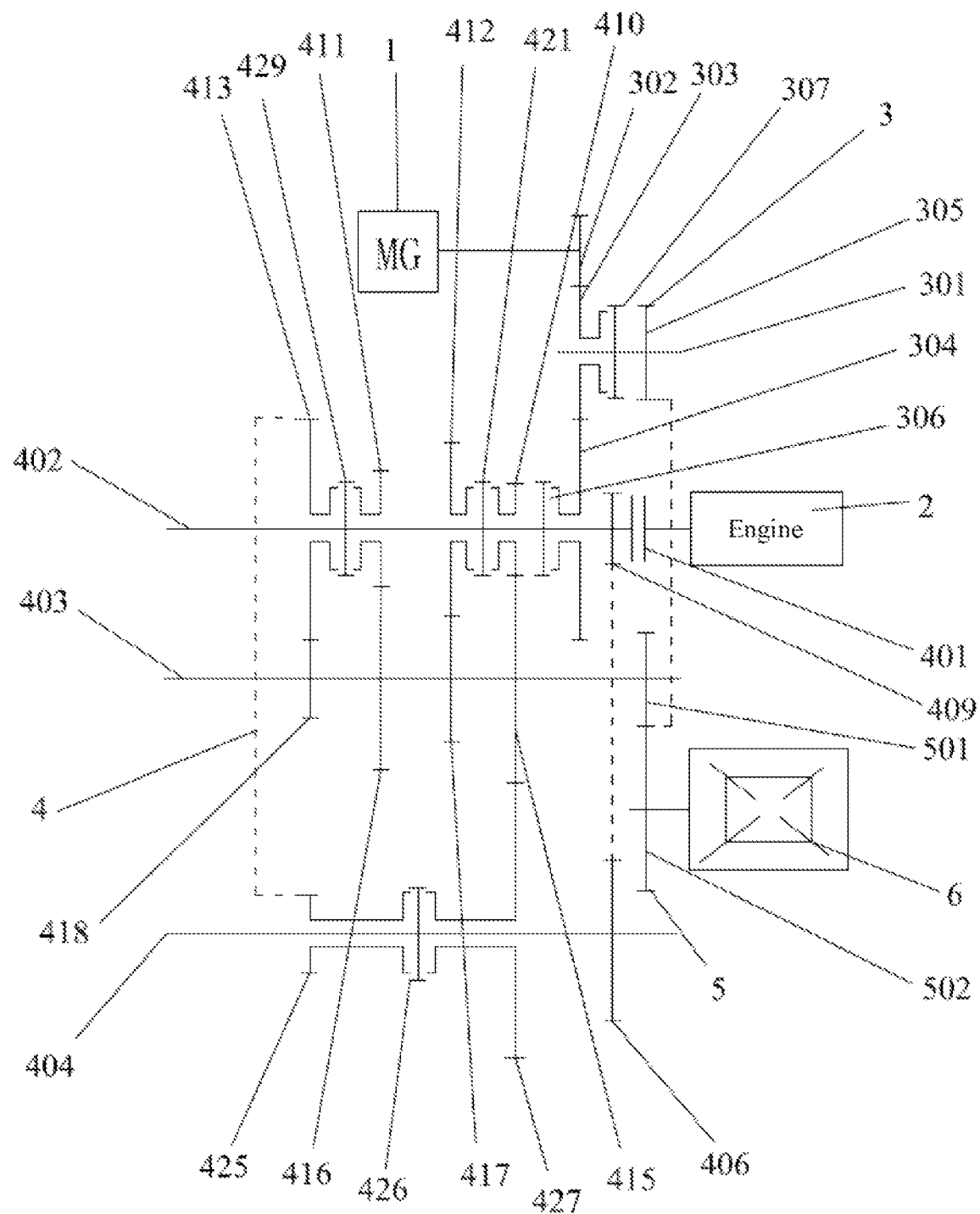
FIG. 12 is a brief structural diagram of a hybrid power-driven system according to a seventh embodiment of this application.
Figure 13:
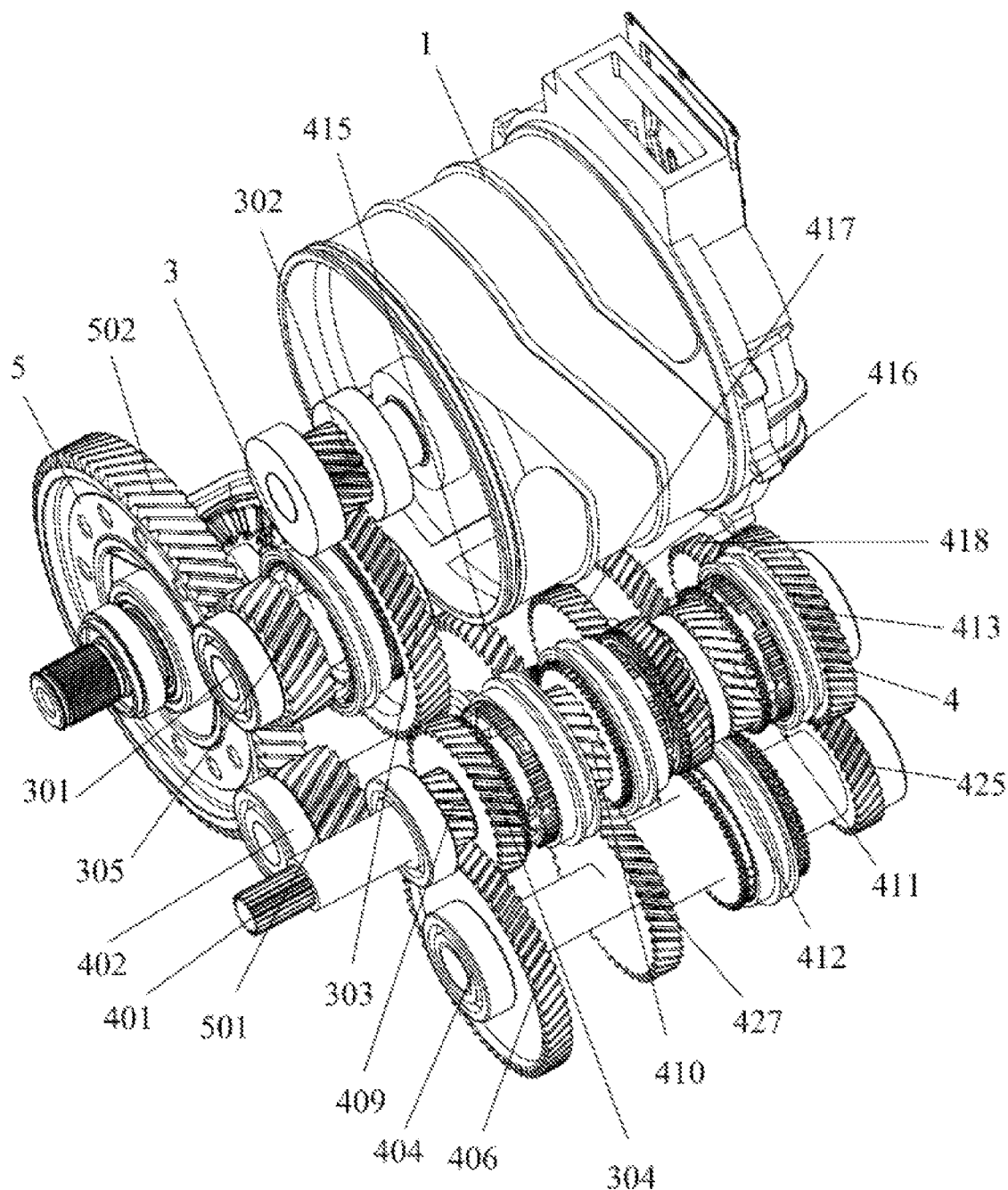
FIG. 13 is a perspective view of a three-dimensional model of the hybrid power-driven system according to the seventh embodiment of this application.
Figure 14:
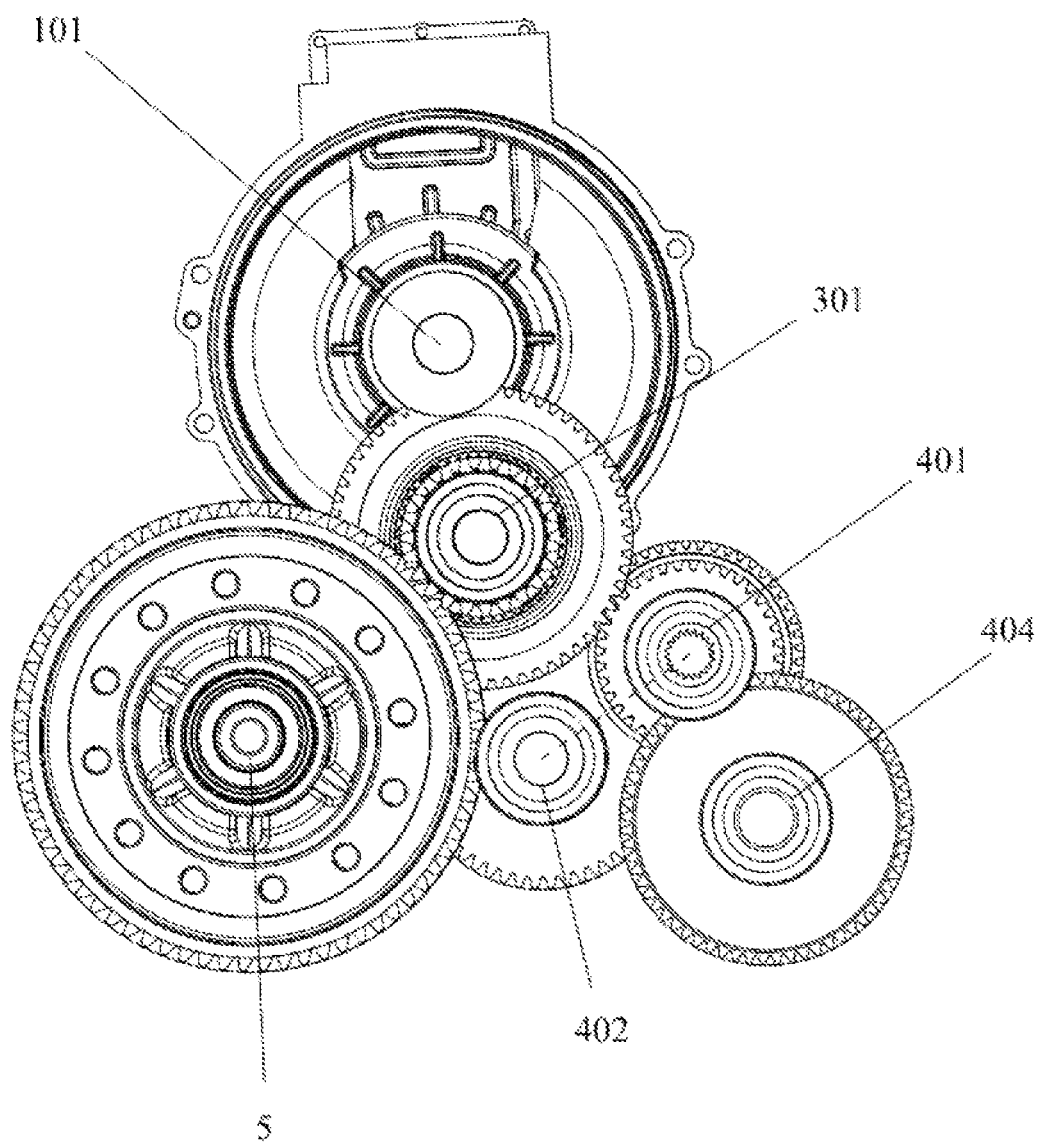
FIG. 14 is a side view of a three-dimensional model of the hybrid power-driven system according to the seventh embodiment of this application.

FIG. 12 to FIG. 14 show a hybrid power-driven system 100 according to a seventh embodiment of this application. A difference between the seventh embodiment and the first embodiment mainly lies in that the transmission mechanism 4 has another gear arrangement form.

The hybrid power-driven system 100 according to the seventh embodiment of this application includes an engine 2, a transmission, and a motor power apparatus. The transmission includes a transmission mechanism 4 and a main reducer 5. The motor power apparatus includes a motor 1 and a power distribution mechanism 3.

The main reducer 5 includes a main reducer driving gear 501 and a main reducer driven gear 502 that are meshed with each other. The main reducer driving gear 501 is fixed on the output shaft 403. The main reducer driven gear 502 is integrated on a housing of a differential 6.

The transmission mechanism 4 includes a clutch apparatus 401, an input shaft 402, an output shaft 403, a reverse gear shaft 404, a reverse gear driven gear 406, a first middle gear 425, a reverse gear shaft synchronizer 426, and a second middle gear 427.

The first middle gear 425 is meshed with one driving gear for forward gears. The reverse gear driven gear 406 is meshed with another driving gear for forward gears. The second middle gear 427 is meshed with one driven gear for forward gears.

The reverse gear shaft synchronizer 426 is disposed on the reverse gear shaft 404 and is located between the first middle gear 425 and the second middle gear 427. The reverse gear shaft synchronizer 426 is selectively joined to or disconnected from the first middle gear 425 and the second middle gear 427. An input end of the clutch apparatus 401 is connected to a crankshaft of the engine 2. An output end of the clutch apparatus 401 is connected to the input shaft 402. The clutch apparatus 401 is selectively joined or disconnected to control power transmission and interruption between the engine 2 and the transmission mechanism 4. The output shaft 403 is connected to the main reducer 5 to transmit power.

Five driving gears for forward gears and four driven gears for forward gears, that is, a first gear driving gear 409, a second gear driving gear 410, a third gear driving gear 411, a fourth gear driving gear 412, a fifth gear driving gear 413, a second gear driven gear 415, a third gear driven gear 416, a fourth gear driven gear 417, and a fifth gear driven gear 418, are disposed on the transmission mechanism 4.

The first gear driving gear 409 is fixed on the input shaft 402. The second gear driving gear 410, the third gear driving gear 411, the fourth gear driving gear 412, and the fifth gear driving gear 413 are freely sleeved on the input shaft 402. The second gear driven gear 415, the third gear driven gear 416, the fourth gear driven gear 417, and the fifth gear driven gear 418 are fixed on the output shaft 403.

The second gear driving gear 410 is meshed with the second gear driven gear 415. The third gear driving gear 411 is meshed with the third gear driven gear 416. The fourth gear driving gear 412 is meshed with the fourth gear driven gear 417. The fifth gear driving gear 413 is meshed with the fifth gear driven gear 418.

The first middle gear 425 is meshed with the fifth gear driving gear 413. The second middle gear 427 is meshed with the second gear driven gear 415. The reverse gear driven gear 406 is meshed with the first gear driving gear 409.

A 3/5 gear synchronizer 429 located between the third gear driving gear 411 and the fifth gear driving gear 413 and a 2/4 gear synchronizer 421 located between the second gear driving gear 410 and the fourth gear driving gear 412 are disposed on the input shaft 402. The 3/5 gear synchronizer 429 is selectively joined to or disconnected from the third gear driving gear 411 and the fifth gear driving gear 413. The 2/4 gear synchronizer 421 is selectively joined to or disconnected from the second gear driving gear 410 and the fourth gear driving gear 412.

The power distribution mechanism 3 includes a motor power distribution shaft 301, a mode selection apparatus, a first transmission apparatus, and a second transmission apparatus. The motor power distribution shaft 301 is disposed independently from the transmission mechanism 4. The motor power distribution shaft 301 is disposed independently from the motor 1. A motor driven gear configured to receive the power of the motor 1 is disposed on the motor power distribution shaft 301.

The first transmission apparatus is connected between the motor power distribution shaft 301 and the input shaft 402 of the transmission mechanism, and is configured to perform power transmission between the motor power distribution shaft 301 and the input shaft 402 of the transmission mechanism. The first transmission apparatus includes a first gear 303 and an input gear 304. The first gear 303 is freely sleeved on the motor power distribution shaft 301. The input gear 304 is freely sleeved on the input shaft 402 of the transmission mechanism 4. The input gear 304 is directly meshed with the first gear 303.

The second transmission apparatus is connected between the main reducer driven gear 502 and the motor power distribution shaft 301, and is configured to perform power transmission between the main reducer driven gear 502 and the motor power distribution shaft 301. The second transmission apparatus includes a second gear 305. The second gear 305 is fixed on the motor power distribution shaft 301. The first gear 303 and the second gear 305 are coaxially disposed. The second gear 305 and the main reducer driven gear 502 of the main reducer 5 are directly meshed.

In the seventh embodiment, the motor driven gear and the first gear 303 are the same gear. That is, the first gear 303 is at the same time used as a motor driven gear.

The power distribution mechanism 3 further includes a motor driving gear 302 fixed on the output shaft 101 of the motor 1. The first gear 303 is directly meshed with the motor driving gear 302.

The mode selection apparatus selectively connects the motor 1 and the input shaft 402 of the transmission mechanism 4 or the motor 1 and the main reducer 5.

The mode selection apparatus includes a first mode synchronizer 306 disposed on the input shaft 402 of the transmission mechanism 4 and a second mode synchronizer 307 disposed on the motor power distribution shaft 301. The first mode synchronizer 306 is selectively joined to or disconnected from the input gear 304. The second mode synchronizer 307 is selectively joined to or disconnected from the first gear 303. The first mode synchronizer 306 is independently disposed. By means of this solution, the axial size of the motor power distribution shaft 301 is shortened, to better facilitate the spatial arrangement of the motor 1, and also further simplify the structure and control method of the power distribution mechanism 3, thereby reducing the quantity of gears and further reducing the manufacturing costs of the system.

When the first mode synchronizer 306 is joined to the input gear 304 and the second mode synchronizer 307 is disconnected from the first gear 303, the hybrid power-driven system 100 is switched to the first mode. When the first mode synchronizer 306 is disconnected from the input gear 304 and the second mode synchronizer 307 is joined to the first gear 303, the hybrid power-driven system 100 is switched to a second mode.

Preferably, the first gear driving gear 409, the input gear 304, the second gear driving gear 410, the fourth gear driving gear 412, the third gear driving gear 411, and the fifth gear driving gear 413 are sequentially arranged along an axis of the input shaft 402 in a direction away from the engine 2. The main reducer driving gear 501, the second gear driven gear 415, the fourth gear driven gear 417, the third gear driven gear 416, and the fifth gear driven gear 418 are sequentially arranged along an axis of the input shaft 402 in a direction away from the engine 2. The reverse gear driven gear 406, the second middle gear 427, and the first middle gear 425 are sequentially arranged along an axis of the reverse gear shaft 404 in a direction of away from the engine 2.

In the transmission mechanism 4 in the seventh embodiment, a power transfer path of the first gear is: the input shaft 402, the first gear driving gear 409, the reverse gear driven gear 406, the reverse gear shaft 404, the first middle gear 425, the fifth gear driving gear 413, the fifth gear driven gear 418, the output shaft 403, the main reducer driving gear 501, and the main reducer driven gear 502. A power transfer path of the reverse gear is: the input shaft 402, the first gear driving gear 409, the reverse gear driven gear 406, the reverse gear shaft 404, the second middle gear 427, the second gear driven gear 415, the output shaft 403, the main reducer driving gear 501, and the main reducer driven gear 502.

In the seventh embodiment, the reverse gear driving gear 405 and the first gear driven gear 414 are omitted. The reverse gear shaft 404 is designed to implement the first gear function and the reverse gear function, so that the axial length of the transmission mechanism 4 can be shortened, thereby reducing the spatial size of the system, to better facilitate the spatial arrangement of the entire vehicle.

FIG. 13 is a perspective view of a three-dimensional model in FIG. 12. It may be learned that the motor power distribution shaft 301 is relatively short, so that a compact arrangement of the motor power distribution shaft 301 and the motor 1 can be implemented, and the motor power distribution shaft can further be flexibly arranged according to different vehicle body platforms and different spaces.

As shown in FIG. 13 and FIG. 14, in the seventh embodiment, the reverse gear shaft 404 and the output shaft 101 of the motor 1 are located on two sides of the plane formed by the axis of the input shaft 102 and the axis of the output shaft 403. In this way, the motor 1 does not interfere with gears on the reverse gear shaft 404 and the reverse gear shaft 404. The output shaft 101 of the motor 1 and the motor power distribution shaft 301 are located on the same side of the plane formed by the axis of the input shaft 102 and the axis of the output shaft 403. The crankshaft of the engine 2 and the input shaft 402 are coaxially arranged. As shown in FIG. 14, the output shaft 101 of the motor 1, the motor power distribution shaft 301, and an axis of the main reducer 5 are spatially arranged in a triangle. That is, the output shaft 101 of the motor 1, the motor power distribution shaft 301, and the radial center of the main reducer 5 are arranged at a particular angle, but are not distributed on the same straight line, which is beneficial to reduce the height of the system, to further reduce the size of the system, making the system more spatially compact.

Eighth Embodiment

Figure 15:
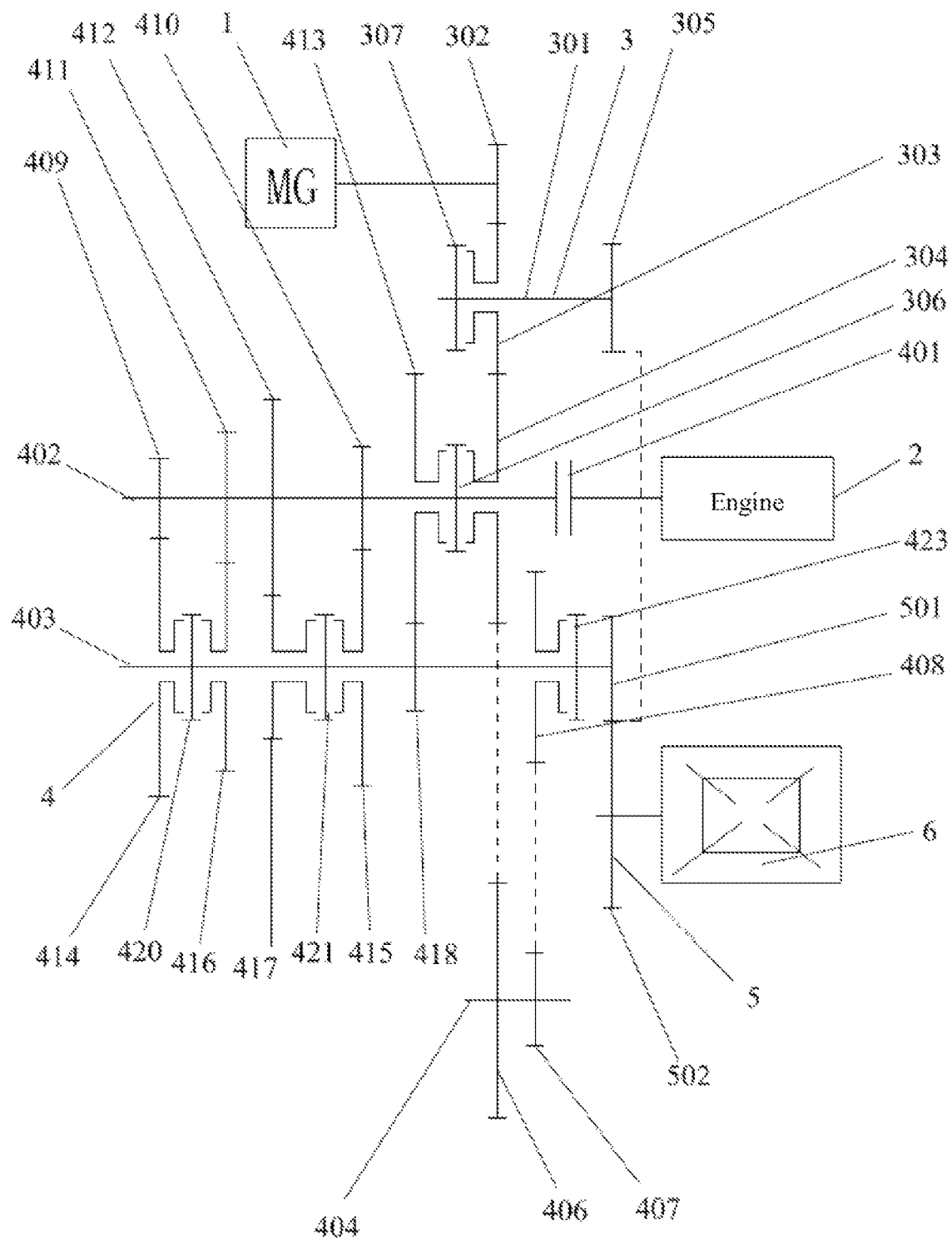
FIG. 15 is a brief structural diagram of a hybrid power-driven system according to an eighth embodiment of this application.

FIG. 15 shows a hybrid power-driven system 100 according to an eighth embodiment of this application. A difference between the eighth embodiment and the first embodiment mainly lies in that the transmission mechanism 4 has another gear arrangement form.

The hybrid power-driven system 100 according to the eighth embodiment of this application includes an engine 2, a transmission, and a motor power apparatus. The transmission includes a transmission mechanism 4 and a main reducer 5. The motor power apparatus includes a motor 1 and a power distribution mechanism 3.

The main reducer 5 includes a main reducer driving gear 501 and a main reducer driven gear 502 that are meshed with each other. The main reducer driving gear 501 is fixed on the output shaft 403. The main reducer driven gear 502 is integrated on a housing of a differential 6.

The transmission mechanism 4 includes a clutch apparatus 401, an input shaft 402, and an output shaft 403. Five driving gears for forward gears, that is, a first gear driving gear 409, a second gear driving gear 410, a third gear driving gear 411, a fourth gear driving gear 412, and a fifth gear driving gear 413, are disposed on the input shaft 402. Five driven gears for forward gears, that is, a first gear driven gear 414, a second gear driven gear 415, a third gear driven gear 416, a fourth gear driven gear 417, and a fifth gear driven gear 418, that are correspondingly meshed with the driving gears for forward gears, are disposed on the output shaft 403. An input end of the clutch apparatus 401 is connected to a crankshaft of the engine 2. An output end of the clutch apparatus 401 is connected to the input shaft 402. The clutch apparatus 401 is selectively joined or disconnected to control power transmission and interruption between the engine 2 and the transmission mechanism 4. The output shaft 403 is connected to the main reducer 5 to transmit power.

The power distribution mechanism 3 includes a motor power distribution shaft 301, a mode selection apparatus, a first transmission apparatus, and a second transmission apparatus. The motor power distribution shaft 301 is disposed independently from the transmission mechanism 4. The motor power distribution shaft 301 is disposed independently from the motor 1. A motor driven gear configured to receive the power of the motor 1 is disposed on the motor power distribution shaft 301.

The first transmission apparatus is connected between the motor power distribution shaft 301 and the input shaft 402 of the transmission mechanism, and is configured to perform power transmission between the motor power distribution shaft 301 and the input shaft 402 of the transmission mechanism. The first transmission apparatus includes a first gear 303 and an input gear 304. The first gear 303 is freely sleeved on the motor power distribution shaft 301. The input gear 304 is freely sleeved on the input shaft 402 of the transmission mechanism 4. The input gear 304 is directly meshed with the first gear 303.

The second transmission apparatus is connected between the main reducer driven gear 502 and the motor power distribution shaft 301, and is configured to perform power transmission between the main reducer driven gear 502 and the motor power distribution shaft 301. The second transmission apparatus includes a second gear 305. The second gear 305 is fixed on the motor power distribution shaft 301. The first gear 303 and the second gear 305 are coaxially disposed. The second gear 305 and the main reducer driven gear 502 of the main reducer 5 are directly meshed.

In the eighth embodiment, the motor driven gear and the first gear 303 are the same gear. That is, the first gear 303 is at the same time used as a motor driven gear.

The power distribution mechanism 3 further includes a motor driving gear 302 fixed on the output shaft 101 of the motor 1. The first gear 303 is directly meshed with the motor driving gear 302.

The mode selection apparatus selectively connects the motor 1 and the input shaft 402 of the transmission mechanism 4 or the motor 1 and the main reducer 5.

The mode selection apparatus includes a first mode synchronizer 306 disposed on the input shaft 402 of the transmission mechanism 4 and a second mode synchronizer 307 disposed on the motor power distribution shaft 301. The first mode synchronizer 306 and the gear position synchronizer (a fifth gear synchronizer) of the transmission mechanism are the same synchronizer. The first mode synchronizer 306 is disposed between the input gear 304 and the fifth gear driving gear 413. The first mode synchronizer 306 is selectively joined to or disconnected from the fifth gear driving gear 413 and the input gear 304. The second mode synchronizer 307 is selectively joined to or disconnected from the first gear 303. By means of this solution, the axial size of the motor power distribution shaft 301 is shortened, to better facilitate the spatial arrangement of the motor 1, and also further simplify the structure and control method of the power distribution mechanism 3, thereby reducing the quantity of gears and further reducing the manufacturing costs of the system.

When the first mode synchronizer 306 is joined to the input gear 304 and the second mode synchronizer 307 is disconnected from the first gear 303, the hybrid power-driven system 100 is switched to the first mode. When the first mode synchronizer 306 is disconnected from the input gear 304 and the second mode synchronizer 307 is joined to the first gear 303, the hybrid power-driven system 100 is switched to a second mode.

The transmission mechanism 4 further includes a reverse gear shaft 404, a reverse gear driven gear 406, a reverse gear middle gear 407, and an output shaft middle gear 408. The output shaft middle gear 408 is freely sleeved on the output shaft 403. The reverse gear driven gear 406 and the reverse gear middle gear 407 are fixed on the reverse gear shaft 404. The input gear 304 is meshed with the reverse gear driven gear 406. The reverse gear middle gear 407 is meshed with the output shaft middle gear 408.

The fifth gear driving gear 413 are freely sleeved on the input shaft 402. The first gear driving gear 409, the second gear driving gear 410, the third gear driving gear 411, and the fourth gear driving gear 412 are fixed on the input shaft 402. The first gear driven gear 414, the second gear driven gear 415, the third gear driven gear 416, and the fourth gear driven gear 417 are freely sleeved on the output shaft 403. The fifth gear driven gear 418 is fixed on the output shaft 403. The output shaft middle gear 408 is fixed on the output shaft 403. The first gear driving gear 409 is meshed with the first gear driven gear 414. The second gear driving gear 410 is meshed with the second gear driven gear 415. The third gear driving gear 411 is meshed with the third gear driven gear 416. The fourth gear driving gear 412 is meshed with the fourth gear driven gear 417. The fifth gear driving gear 413 is meshed with the fifth gear driven gear 418.

A 1/3 gear synchronizer 420 located between the first gear driven gear 414 and the third gear driven gear 416, a 2/4 gear synchronizer 421 located between the second gear driven gear 415 and the fourth gear driven gear 417, and an R gear synchronizer 423 located on an axial side of the output shaft middle gear 408 are disposed on the output shaft 403. The R gear synchronizer 423 is selectively joined to or disconnected from the output shaft middle gear 408. The 1/3 gear synchronizer 420 is selectively joined to or disconnected from the first gear driven gear 414 and the third gear driven gear 416. The 2/4 gear synchronizer 421 is selectively joined to or disconnected from the second gear driven gear 415 and the fourth gear driven gear 417.

Preferably, the input gear 304, the fifth gear driving gear 413, the second gear driving gear 410, the fourth gear driving gear 412, the third gear driving gear 411, and the first gear driving gear 409 are sequentially arranged along an axis of the input shaft 402 in a direction away from the engine 2. The main reducer driving gear 501, the output shaft middle gear 408, the fifth gear driven gear 418, the second gear driven gear 415, the fourth gear driven gear 417, the third gear driven gear 416, and the first gear driven gear 414 are sequentially arranged along an axis of the output shaft 403 in a direction away from the engine 2.

In the eighth embodiment, the axial length of the transmission mechanism 4 can be shortened, to better facilitate the spatial arrangement of the entire vehicle.

Ninth Embodiment

Figure 16:
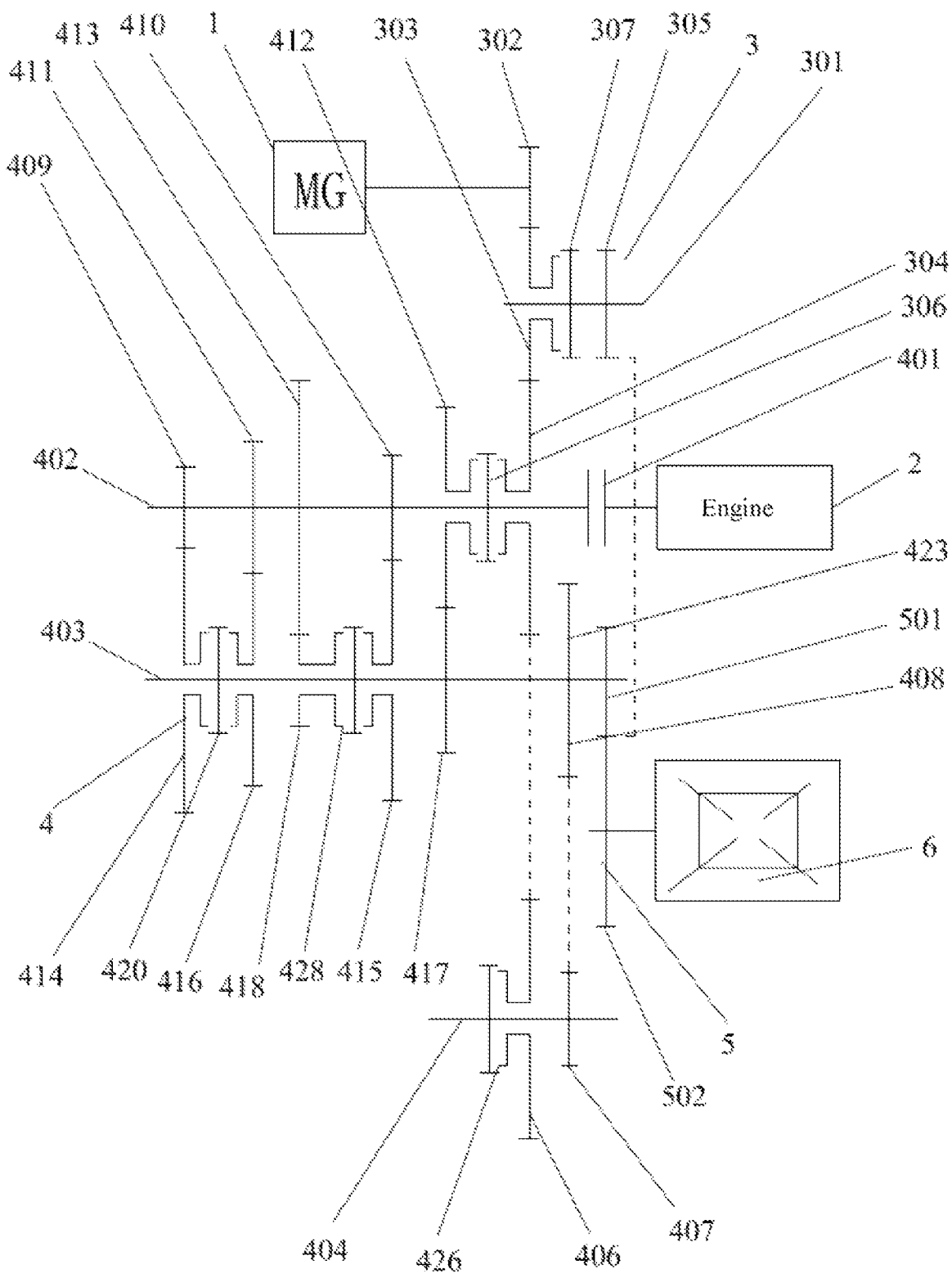
FIG. 16 is a brief structural diagram of a hybrid power-driven system according to a ninth embodiment of this application.
Figure 17:
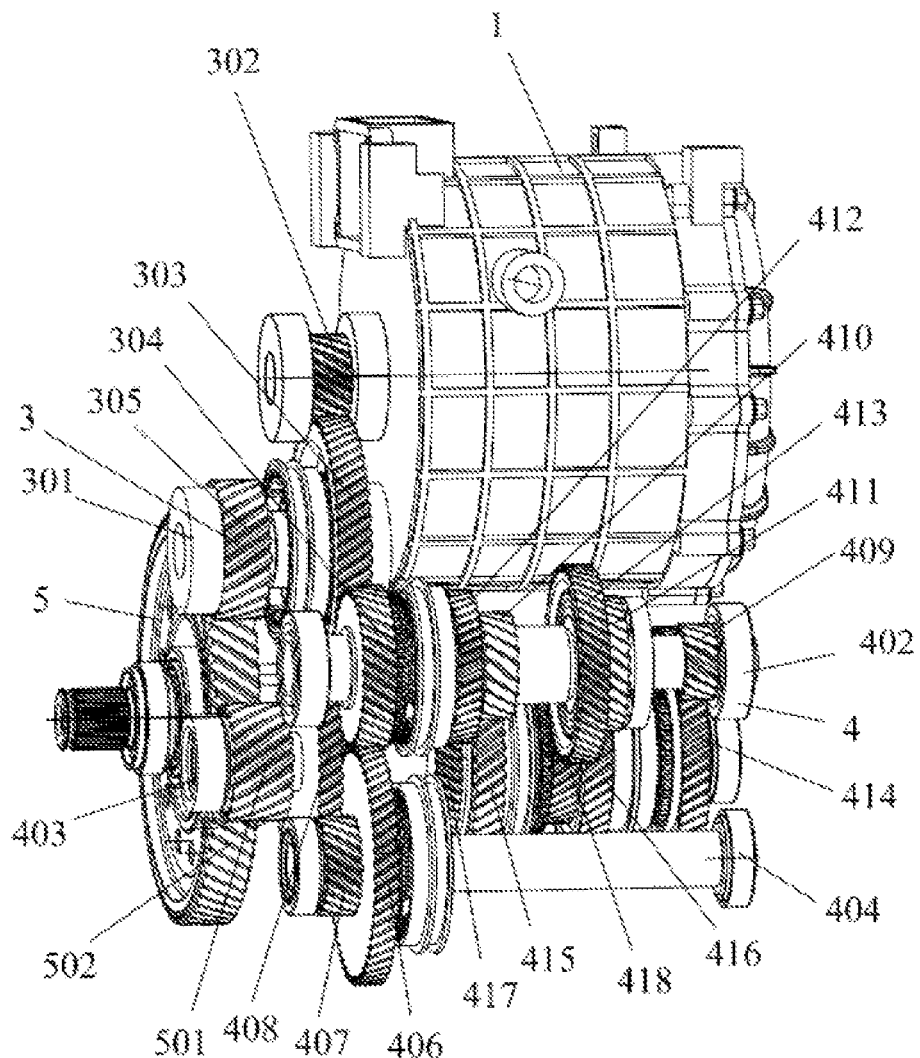
FIG. 17 is a perspective view of a three-dimensional model of the hybrid power-driven system according to the ninth embodiment of this application.
Figure 18:
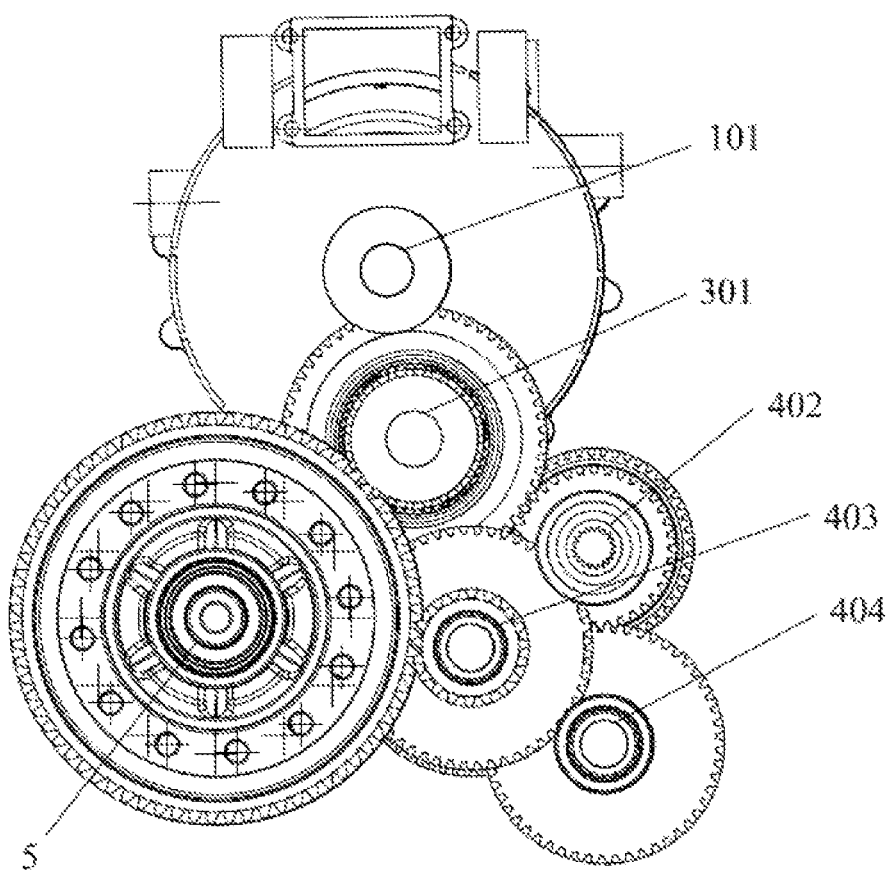
FIG. 18 is a side view of a three-dimensional model of the hybrid power-driven system according to the ninth embodiment of this application.

FIG. 16 to FIG. 18 show a hybrid power-driven system 100 according to a ninth embodiment of this application. A difference between the ninth embodiment and the eighth embodiment mainly lies in that the transmission mechanism 4 has another gear arrangement form.

The difference between the ninth embodiment and the eighth embodiment lies in that the transmission mechanism further includes a reverse gear shaft 404, a reverse gear driven gear 406, a reverse gear middle gear 407, a reverse gear shaft synchronizer 426, and an output shaft middle gear 408. The output shaft middle gear 408 is disposed on the output shaft 403. The reverse gear driven gear 406 is freely sleeved on the reverse gear shaft 404. The reverse gear middle gear 407 is fixed on the reverse gear shaft 404. The input gear 304 is meshed with the reverse gear driven gear 406. The reverse gear middle gear 407 is meshed with the output shaft middle gear 408. The reverse gear shaft synchronizer 426 is selectively joined to or disconnected from the reverse gear driven gear 406.

Another difference between the ninth embodiment and the eighth embodiment is that the positions of the fifth-gear gear set and the fourth-gear gear set are interchanged.

The fourth gear driving gear 412 is freely sleeved on the input shaft 402. The first gear driving gear 409, the second gear driving gear 410, the third gear driving gear 411, and the fifth gear driving gear 413 are fixed on the input shaft 402. The first gear driven gear 414, the second gear driven gear 415, the third gear driven gear 416, and the fifth gear driven gear 418 are freely sleeved on the output shaft 403. The fourth gear driven gear 417 is fixed on the output shaft 403. The output shaft middle gear 408 is fixed on the output shaft 403.

The first mode synchronizer 306 is disposed between the input gear 304 and the fourth gear driving gear 412. The first mode synchronizer 306 is selectively joined to or disconnected from the fourth gear driving gear 412 and the input gear 304.

A 1/3 gear synchronizer 420 located between the first gear driven gear 409 and the third gear driven gear 416 and a 2/5 gear synchronizer 428 located between the second gear driven gear 415 and the fifth gear driven gear 418 are disposed on the output shaft 403. The 1/3 gear synchronizer is selectively joined to or disconnected from the first gear driven gear 409 and the third gear driven gear 416. The 2/5 gear synchronizer 428 is selectively joined to or disconnected from the second gear driven gear 415 and the fifth gear driven gear 418.

FIG. 17 is a perspective view of a three-dimensional model in FIG. 16. It may be learned that the motor power distribution shaft 301 is relatively short, so that a compact arrangement of the motor power distribution shaft 301 and the motor 1 can be implemented, and the motor power distribution shaft can further be flexibly arranged according to different vehicle body platforms and different spaces.

As shown in FIG. 18, the output shaft 101 of the motor 1, the motor power distribution shaft 301, and an axis of the main reducer 5 are spatially arranged in a triangle. That is, the output shaft 101 of the motor 1, the motor power distribution shaft 301, and the radial center of the main reducer 5 are arranged at a particular angle, but are not distributed on the same straight line, which is beneficial to reduce the height of the system, to further reduce the size of the system, making the system more spatially compact.

In the ninth embodiment, to implement mobile power generation during high-speed driving, the fifth gear driving gear 413 is disposed at a position that is not correlated to the first mode synchronizer 306.

In the ninth embodiment, the axial length of the transmission mechanism 4 can be shortened, to better facilitate the spatial arrangement of the entire vehicle.

Tenth Embodiment

Figure 19:
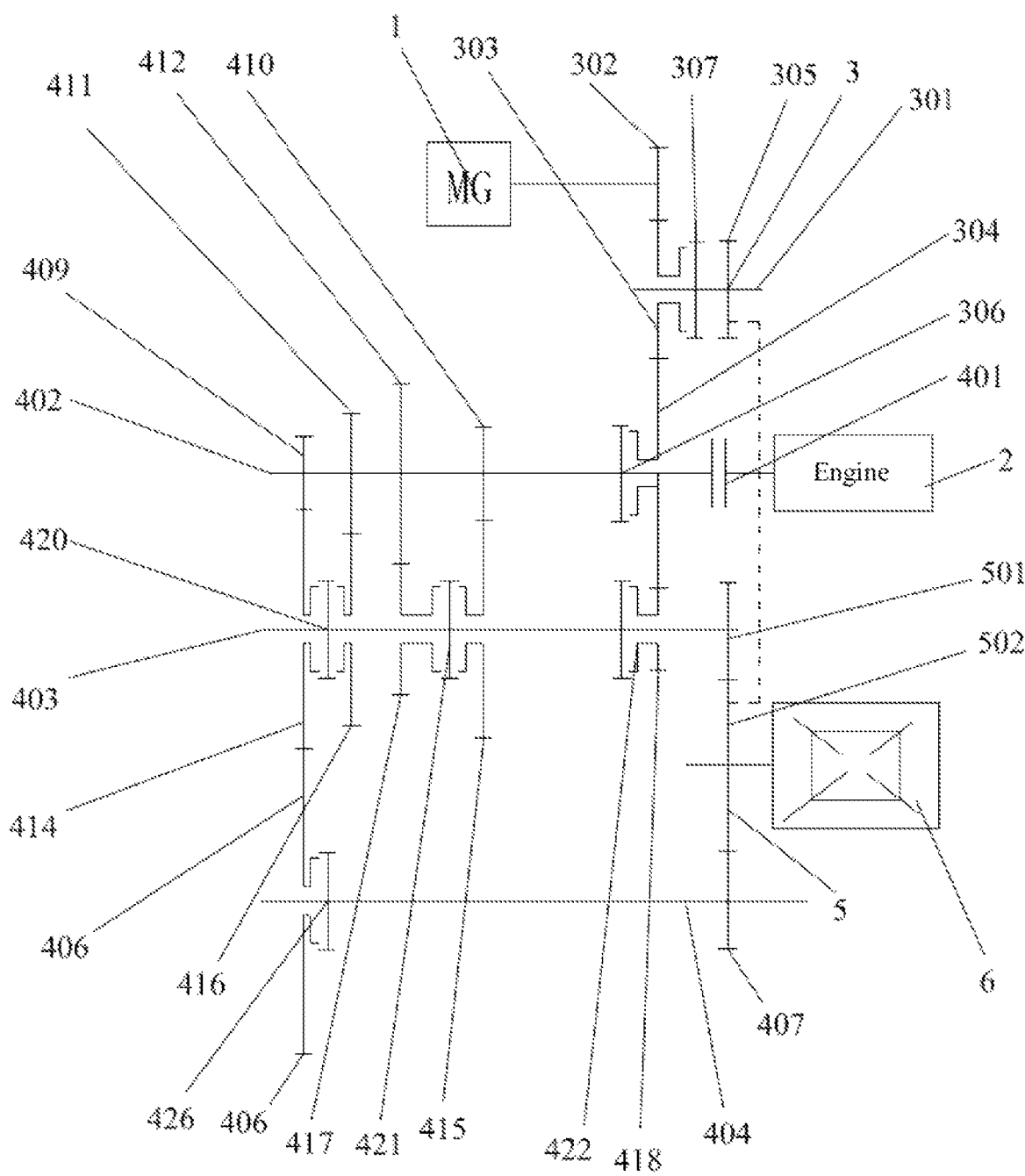
FIG. 19 is a brief structural diagram of a hybrid power-driven system according to a tenth embodiment of this application.

FIG. 19 shows a hybrid power-driven system 100 according to a tenth embodiment of this application. A difference between the tenth embodiment and the fifth embodiment in FIG. 10 lies in that the fifth gear driving gear on the input shaft 402 of the transmission mechanism 4 is reused as the input gear 304. That is, the fifth gear driving gear and the input gear 304 are the same gear.

That is, a plurality of driving gears for forward gears include a first gear driving gear 409, a second gear driving gear 410, a third gear driving gear 411, and a fourth gear driving gear 412. A plurality of driven gears for forward gears include a first gear driven gear 414, a second gear driven gear 415, a third gear driven gear 416, a fourth gear driven gear 417, and a fifth gear driven gear 418.

The first gear driving gear 409, the second gear driving gear 410, the third gear driving gear 411, and the fourth gear driving gear 412 are fixed on the input shaft 402. The first gear driven gear 414, the second gear driven gear 415, the third gear driven gear 416, the fourth gear driven gear 417, and the fifth gear driven gear 418 are freely sleeved on the output shaft 403. The first gear driving gear 409 is meshed with the first gear driven gear 414. The second gear driving gear 410 is meshed with the second gear driven gear 415. The third gear driving gear 411 is meshed with the third gear driven gear 416. The fourth gear driving gear 412 is meshed with the fourth gear driven gear 417. The input gear 304 is meshed with the fifth gear driven gear 418. The reverse gear driven gear 406 is meshed with the first gear driven gear 414.

A 1/3 gear synchronizer 420 located between the first gear driven gear 414 and the third gear driven gear 416, a 2/4 gear synchronizer 421 located between the second gear driven gear 415 and the fourth gear driven gear 417, and a fifth gear synchronizer 422 located on an axial side of the fifth gear driven gear 418 are disposed on the output shaft 403. The fifth gear synchronizer 422 is selectively joined to or disconnected from the fifth gear driven gear 418. The 1/3 gear synchronizer 420 is selectively joined to or disconnected from the first gear driven gear 414 and the third gear driven gear 416. The 2/4 gear synchronizer 421 is selectively joined to or disconnected from the second gear driven gear 415 and the fourth gear driven gear 417.

Eleventh Embodiment

Figure 20:
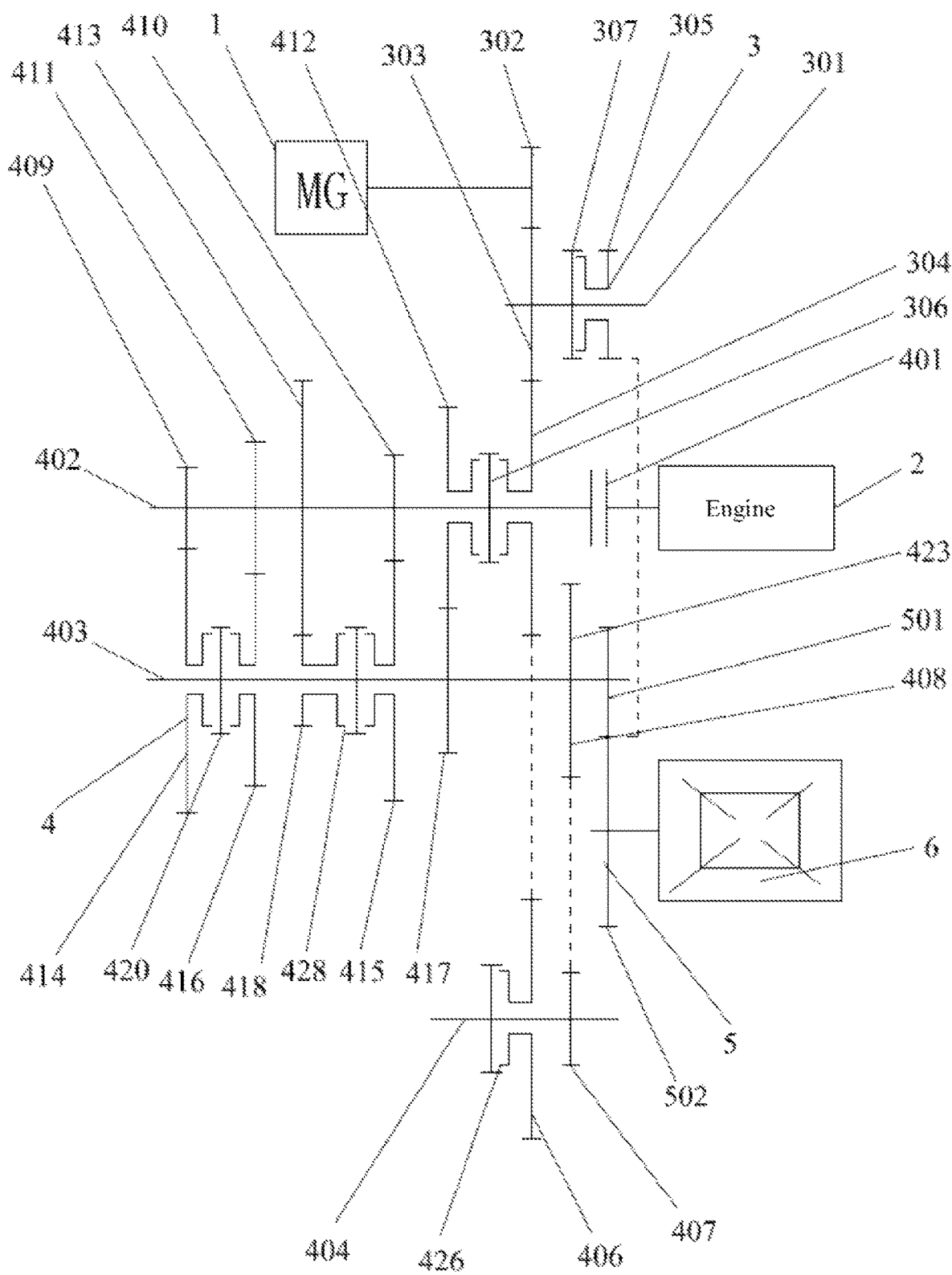
FIG. 20 is a brief structural diagram of a hybrid power-driven system according to an eleventh embodiment of this application.
Figure 21:
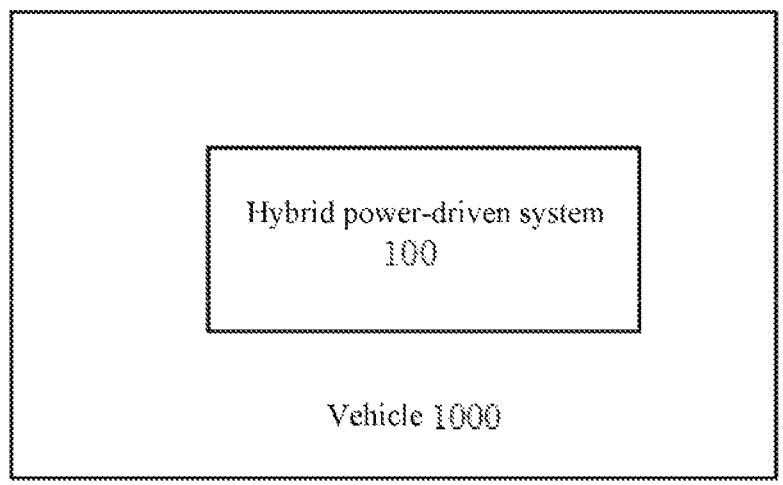
FIG. 21 is an architectural diagram of a vehicle according to an embodiment of this application.

FIG. 20 shows a hybrid power-driven system 100 according to an eleventh embodiment of this application. A difference between the eleventh embodiment and the ninth embodiment in FIG. 16 lies in that the first gear 303 is fixed on the power distribution shaft 301, the second gear 305 is freely sleeved on the power distribution shaft 301, and the input gear 304 is freely sleeved on the input shaft 402 of the transmission mechanism. The first gear 303 and the motor driven gear are the same gear, and the same gear is disposed on the power distribution shaft 301.

The first mode synchronizer 306 is selectively joined to or disconnected from the input gear 304. The second mode synchronizer 307 is selectively joined to or disconnected from the second gear 305.

When the first mode synchronizer 306 is joined to the input gear 304 and the second mode synchronizer 307 is disconnected from the second gear 305, the hybrid power-driven system 100 is switched to the first mode. When the first mode synchronizer 306 is disconnected from the input gear 304 and the second mode synchronizer 307 is joined to the second gear 305, the hybrid power-driven system 100 is switched to a second mode.

Twelfth Embodiment

The hybrid power-driven system provided in the twelfth embodiment includes an engine, a transmission, and a motor power apparatus. The transmission and the motor power apparatus are two independent modules. The motor power apparatus includes a motor and a power distribution mechanism.

The power distribution mechanism includes a motor power distribution shaft, a mode selection apparatus, a first transmission apparatus, and a second transmission apparatus. The motor power distribution shaft is disposed independently from a transmission mechanism. The motor power distribution shaft is disposed independently from the motor. The hybrid power-driven system is selectively switched between a first mode and a second mode by using the mode selection apparatus. A motor driven gear configured to receive power of the motor is disposed on the motor power distribution shaft.

The first transmission apparatus includes a first gear. The first gear is disposed on the motor power distribution shaft. The first gear is directly meshed with one gear position driving gear on the input shaft of the transmission. The second transmission apparatus includes a second gear. The second gear is disposed on the motor power distribution shaft. The first gear and the second gear are coaxially disposed. The second gear is directly meshed with a main reducer driven gear of the transmission. The mode selection apparatus selectively connects the motor and the input shaft of the transmission or the motor and a main reducer of the transmission.

In the twelfth embodiment, the transmission and the motor power apparatus are two independent modules, and the first gear is directly meshed with one gear position driving gear on the input shaft of the transmission. In this way, the design of a conventional transmission is not changed, and only a motor power apparatus (a motor and a power distribution mechanism) is added based on the conventional transmission, so that the hybrid power can be implemented. The hybrid power-driven system is selectively switched between the first mode and the second mode by using the mode selection apparatus to implement a multi-mode output, so that the design costs are lower, the design cycle is shorter, and the reliability is higher. The engine and the motor are separately controlled, so that the control logic is simpler and clearer, and the compatibility is higher (compatible with transmissions of different models).

When the hybrid power system in the foregoing embodiment is applied to a plug-type hybrid power system, the power of the motor 1 has a relatively high requirement, and the motor 1 that needs to be chosen has a relatively large size. Therefore, the motor 1 is connected to the motor power distribution shaft 301 by one-stage gear transmission (a motor driving gear and a motor driven gear).

However, in other embodiments, if the motor in the system has a relatively low power requirement, a small-scale motor is chosen, and an output shaft of the motor may be directly connected to the motor power distribution shaft. In this case, the first gear or the motor driven gear are not required.

In the selection of gear positions, the applicant performs simulation analysis in aspects such as economy and dynamic performance on cases in which four gears, five gears, and six gears are used in the system. In the aspect of economy, five gears are more economical than four gears by 2%, six gears are more economical than four gears by 2%, and five gears are more economical than six gears by 0.1%. In the aspect of dynamic performance, in a pure engine mode, five gears are faster than four gears by 4.4%, six gears are faster than four gears by 10.2%, and six gears are faster than five gears by 6.1%. In the HEV mode, five gears are faster than four gears by 0.4%, six gears are faster than four gears by 1.7%, and six gears are faster than five gears by 1.2%. In comprehensive consideration of the dynamic performance, economy, and energy consumption indicators of a hybrid power system, it is selected that an optimal design solution is five gears, so that the system structure tends to be simplified, and there are also advantages in aspects such as dynamic performance and economy.

Therefore, in the foregoing embodiments, the transmission mechanism 4 has five forward gears. That is, five gears are used for the transmission mechanism 4.

However, in other embodiments, there may be alternatively one to four or six to twelve forward gears. That is, one to four gears or six to twelve gears are also used for the transmission mechanism 4.

Embodiments of this application further provide a vehicle, including the hybrid power-driven system in the foregoing embodiments.

A technical problem to be resolved by this application is to provide a hybrid power-driven system and a vehicle, to resolve the contradiction between transmission efficiency and spatial arrangement.

To resolve the foregoing technical problem, in an aspect, embodiments of this application provide a hybrid power-driven system, including an engine, a transmission, and a motor power apparatus, the transmission including a transmission mechanism and a main reducer, the motor power apparatus including a motor and a power distribution mechanism, where the transmission mechanism includes a clutch apparatus, at least one input shaft, and at least one output shaft, at least one driving gear for forward gears is disposed on the input shaft, at least one driven gear for forward gears correspondingly meshed with the driving gear for forward gears is disposed on the output shaft, an input end of the clutch apparatus is connected to the engine, and the output shaft is connected to the main reducer to transmit power;

the power distribution mechanism includes a motor power distribution shaft, a mode selection apparatus, a first transmission apparatus, and a second transmission apparatus, the motor power distribution shaft is disposed independently from the transmission mechanism, and the motor power distribution shaft is disposed independently from the motor; and a motor driven gear configured to receive power of the motor is disposed on the motor power distribution shaft; and the first transmission apparatus includes a first gear and an input gear, the first gear is disposed on the motor power distribution shaft, the input gear is disposed on the input shaft of the transmission mechanism, and the input gear is directly meshed with the first gear; the second transmission apparatus includes a second gear, the second gear is disposed on the motor power distribution shaft, the first gear and the second gear are coaxially disposed, and the second gear is directly meshed with a main reducer driven gear of the main reducer; and the mode selection apparatus selectively connects the motor and the input shaft of the transmission mechanism or the motor and the main reducer.

In an embodiment of this application, the input gear is independently disposed on the input shaft of the transmission mechanism; or, one gear position driving gear on the input shaft of the transmission mechanism is reused as the input gear.

In an embodiment of this application, the hybrid power-driven system is selectively switched between a first mode and a second mode by using the mode selection apparatus; and the mode selection apparatus is independently disposed at a position between the first gear and the second gear on the power distribution shaft, and the input gear is fixedly disposed on the input shaft of the transmission mechanism; or the mode selection apparatus includes two parts, a first part is disposed on the power distribution shaft, a second part is independently disposed on an input gear of the input shaft of the transmission mechanism or a second part and the gear position synchronizer of the transmission mechanism are the same part, and the input gear is freely sleeved on the input shaft of the transmission mechanism.

In an embodiment of this application, the motor driven gear and the first gear are respectively independently disposed, or, the motor driven gear and the first gear are the same gear.

In an embodiment of this application, the first gear is freely sleeved on the power distribution shaft, the second gear is freely sleeved on the power distribution shaft, and the input gear is fixed on the input shaft of the transmission mechanism; or, the first gear is freely sleeved on the power distribution shaft, the second gear is fixed on the power distribution shaft, and the input gear is freely sleeved on the input shaft of the transmission mechanism; or, the first gear is fixed on the power distribution shaft, the second gear is freely sleeved on the power distribution shaft, and the input gear is freely sleeved on the input shaft of the transmission mechanism.

In an embodiment of this application, the second gear is freely sleeved on the power distribution shaft, the first gear and the motor driven gear are respectively independently disposed on the power distribution shaft; or, the first gear and the motor driven gear are the same gear, and the same gear is disposed on the power distribution shaft.

In an embodiment of this application, the power distribution mechanism further includes a motor driving gear fixed on an output shaft of the motor, the first gear is freely sleeved on the motor power distribution shaft, the input gear is freely sleeved on the input shaft, the first gear and the motor driving gear are directly meshed or the first gear is meshed with the motor driving gear by an idler gear, and the second gear is fixed on the motor power distribution shaft; the mode selection apparatus includes a first mode synchronizer disposed on the input shaft of the transmission mechanism and a second mode synchronizer disposed on the motor power distribution shaft, the first mode synchronizer is selectively joined to or disconnected from the input gear, the second mode synchronizer is selectively joined to or disconnected from the first gear, and the first mode synchronizer is independently disposed or the first mode synchronizer and the gear position synchronizer of the transmission mechanism are the same synchronizer; when the first mode synchronizer is joined to the input gear and the second mode synchronizer is disconnected from the first gear, the hybrid power-driven system is switched to the first mode; and when the first mode synchronizer is disconnected from the input gear and the second mode synchronizer is joined to the first gear, the hybrid power-driven system is switched to a second mode.

In an embodiment of this application, the power distribution mechanism further includes a motor driving gear fixed on an output shaft of the motor, the first gear is fixed on the motor power distribution shaft, the input gear is freely sleeved on the input shaft, the first gear and the motor driving gear are directly meshed or the first gear is meshed with the motor driving gear by an idler gear, and the second gear is freely sleeved on the motor power distribution shaft; the mode selection apparatus includes a first mode synchronizer disposed on the input shaft of the transmission mechanism and a second mode synchronizer disposed on the motor power distribution shaft, the first mode synchronizer is selectively joined to or disconnected from the input gear, the second mode synchronizer is selectively joined to or disconnected from the second gear, and the first mode synchronizer is independently disposed or the first mode synchronizer and the gear position synchronizer of the transmission mechanism are the same synchronizer; when the first mode synchronizer is joined to the input gear and the second mode synchronizer is disconnected from the second gear, the hybrid power-driven system is switched to the first mode; and when the first mode synchronizer is disconnected from the input gear and the second mode synchronizer is joined to the second gear, the hybrid power-driven system is switched to a second mode.

In an embodiment of this application, the transmission mechanism further includes a reverse gear shaft, a reverse gear driven gear, a reverse gear middle gear, a reverse gear shaft synchronizer, and an output shaft middle gear, the output shaft middle gear is disposed on the output shaft, the reverse gear driven gear is freely sleeved on the reverse gear shaft, the reverse gear middle gear is fixed on the reverse gear shaft, the input gear is meshed with the reverse gear driven gear, the reverse gear middle gear is meshed with the output shaft middle gear, and the reverse gear shaft synchronizer is selectively joined to or disconnected from the reverse gear driven gear.

In an embodiment of this application, the transmission mechanism includes a plurality of driving gears for forward gears and a plurality of driven gears for forward gears, the plurality of driving gears for forward gears include a first gear driving gear, a second gear driving gear, a third gear driving gear, a fourth gear driving gear, and a fifth gear driving gear, and the plurality of driven gears for forward gears include a first gear driven gear, a second gear driven gear, a third gear driven gear, a fourth gear driven gear, and a fifth gear driven gear; the fourth gear driving gear is freely sleeved on the input shaft, the first gear driving gear, the second gear driving gear, the third gear driving gear, and the fifth gear driving gear are fixed on the input shaft, the first gear driven gear, the second gear driven gear, the third gear driven gear, and the fifth gear driven gear are freely sleeved on the output shaft, the fourth gear driven gear is fixed on the output shaft, and the output shaft middle gear is fixed on the output shaft; the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear; the first mode synchronizer is disposed between the input gear and the fourth gear driving gear, and the first mode synchronizer is selectively joined to or disconnected from the fourth gear driving gear and the input gear; a 1/3 gear synchronizer located between the first gear driven gear and the third gear driven gear and a 2/5 gear synchronizer located between the second gear driven gear and the fifth gear driven gear are disposed on the output shaft, the 1/3 gear synchronizer is selectively joined to or disconnected from the first gear driven gear and the third gear driven gear, and the 2/5 gear synchronizer is selectively joined to or disconnected from the second gear driven gear and the fifth gear driven gear.

In an embodiment of this application, the power distribution mechanism further includes a motor driving gear fixed on an output shaft of the motor, the motor driving gear is meshed with the motor driven gear, the motor driven gear is fixed on the motor power distribution shaft, the first gear and the second gear are freely sleeved on the motor power distribution shaft, and the input gear is fixed on the input shaft; the mode selection apparatus includes a first/second mode synchronizer disposed on the motor power distribution shaft, and the first/second mode synchronizer is selectively joined to or disconnected from the first gear and the second gear; when the first/second mode synchronizer is joined to the first gear, the hybrid power-driven system is switched to the first mode; and when the first/second mode synchronizer is joined to the second gear, the hybrid power-driven system is switched to a second mode.

In an embodiment of this application, the transmission mechanism further includes a reverse gear shaft, a reverse gear driving gear, a reverse gear driven gear, a reverse gear middle gear, and an output shaft middle gear, the reverse gear driving gear is freely sleeved on the input shaft, the output shaft middle gear is disposed on the output shaft, the reverse gear driven gear and the reverse gear middle gear are fixed on the reverse gear shaft, the reverse gear driving gear is meshed with the reverse gear driven gear, and the reverse gear middle gear is meshed with the output shaft middle gear.

In an embodiment of this application, the transmission mechanism includes a plurality of driving gears for forward gears and a plurality of driven gears for forward gears, the plurality of driving gears for forward gears include a first gear driving gear, a second gear driving gear, a third gear driving gear, a fourth gear driving gear, and a fifth gear driving gear, and the plurality of driven gears for forward gears include a first gear driven gear, a second gear driven gear, a third gear driven gear, a fourth gear driven gear, and a fifth gear driven gear; the reverse gear driving gear and the fifth gear driving gear are freely sleeved on the input shaft, the first gear driving gear, the second gear driving gear, the third gear driving gear, and the fourth gear driving gear are fixed on the input shaft, the first gear driven gear, the second gear driven gear, the third gear driven gear, and the fourth gear driven gear are freely sleeved on the output shaft, the fifth gear driven gear is fixed on the output shaft, and the output shaft middle gear is fixed on the output shaft; the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear; a 5/R gear synchronizer located between the fifth gear driving gear and the reverse gear driving gear is disposed on the input shaft, and the 5/R gear synchronizer is selectively joined to or disconnected from the fifth gear driving gear and the reverse gear driving gear; and a 1/3 gear synchronizer located between the first gear driven gear and the third gear driven gear and a 2/4 gear synchronizer located between the second gear driven gear and the fourth gear driven gear are disposed on the output shaft, the 1/3 gear synchronizer is selectively joined to or disconnected from the first gear driven gear and the third gear driven gear, and the 2/4 gear synchronizer is selectively joined to or disconnected from the second gear driven gear and the fourth gear driven gear.

In an embodiment of this application, the transmission mechanism further includes a reverse gear shaft, a reverse gear driven gear, a reverse gear middle gear, a reverse gear shaft synchronizer, and an output shaft middle gear, the output shaft middle gear is freely sleeved on the output shaft, the reverse gear driven gear and the reverse gear middle gear are disposed on the reverse gear shaft, the input gear is meshed with the reverse gear driven gear, the reverse gear middle gear is meshed with the output shaft middle gear, the reverse gear shaft synchronizer is disposed on the output shaft, and the reverse gear shaft synchronizer is selectively joined to or disconnected from the output shaft middle gear.

In an embodiment of this application, the transmission mechanism includes a plurality of driving gears for forward gears and a plurality of driven gears for forward gears, the plurality of driving gears for forward gears include a first gear driving gear, a second gear driving gear, a third gear driving gear, a fourth gear driving gear, and a fifth gear driving gear, and the plurality of driven gears for forward gears include a first gear driven gear, a second gear driven gear, a third gear driven gear, a fourth gear driven gear, and a fifth gear driven gear; the first gear driving gear, the second gear driving gear, the third gear driving gear, the fourth gear driving gear, and the fifth gear driving gear are fixed on the input shaft, and the first gear driven gear, the second gear driven gear, the third gear driven gear, the fourth gear driven gear, and the fifth gear driven gear are freely sleeved on the output shaft; the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear; and a 1/3 gear synchronizer located between the first gear driven gear and the third gear driven gear, a 2/4 gear synchronizer located between the second gear driven gear and the fourth gear driven gear, and a 5/R gear synchronizer located between the fifth gear driven gear and the output shaft middle gear are disposed on the output shaft, the 1/3 gear synchronizer is selectively joined to or disconnected from the first gear driven gear and the third gear driven gear, the 2/4 gear synchronizer is selectively joined to or disconnected from the second gear driven gear and the fourth gear driven gear, and the 5/R gear synchronizer is selectively joined to or disconnected from the fifth gear driven gear and the output shaft middle gear.

In an embodiment of this application, the transmission mechanism further includes a reverse gear shaft, a reverse gear driven gear, a reverse gear middle gear, a reverse gear shaft synchronizer, and an output shaft middle gear, the output shaft middle gear is freely sleeved on the output shaft, the reverse gear driven gear and the reverse gear middle gear are disposed on the reverse gear shaft, one driving gear for forward gears is meshed with the reverse gear driven gear, the reverse gear middle gear is meshed with the output shaft middle gear, the reverse gear shaft synchronizer is disposed on the output shaft, and the reverse gear shaft synchronizer is selectively joined to or disconnected from the output shaft middle gear.

In an embodiment of this application, the transmission mechanism includes a plurality of driving gears for forward gears and a plurality of driven gears for forward gears, the plurality of driving gears for forward gears include a first gear driving gear, a second gear driving gear, a third gear driving gear, a fourth gear driving gear, and a fifth gear driving gear, the plurality of driven gears for forward gears include a first gear driven gear, a second gear driven gear, a third gear driven gear, a fourth gear driven gear, and a fifth gear driven gear, and the first gear driving gear is meshed with the reverse gear driven gear; the first gear driving gear, the second gear driving gear, the third gear driving gear, and the fourth gear driving gear are fixed on the input shaft, the fifth gear driving gear is freely sleeved on the input shaft, the first gear driven gear, the second gear driven gear, the third gear driven gear, and the fourth gear driven gear are freely sleeved on the output shaft, and the fifth gear driven gear is fixed on the output shaft; the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear; and the first mode synchronizer is disposed between the input gear and the fifth gear driving gear, a 1/3 gear synchronizer located between the first gear driven gear and the third gear driven gear, a 2/4 gear synchronizer located between the second gear driven gear and the fourth gear driven gear, and an R gear synchronizer located on an axial side of the output shaft middle gear are disposed on the output shaft, the first mode synchronizer is selectively joined to or disconnected from the input gear and the fifth gear driving gear, the 1/3 gear synchronizer is selectively joined to or disconnected from the first gear driven gear and the third gear driven gear, the 2/4 gear synchronizer is selectively joined to or disconnected from the second gear driven gear and the fourth gear driven gear, and the R gear synchronizer is selectively joined to or disconnected from the output shaft middle gear.

In an embodiment of this application, the transmission mechanism further includes a reverse gear shaft, a reverse gear driven gear, a reverse gear middle gear, a reverse gear shaft synchronizer, and an output shaft middle gear, the output shaft middle gear is disposed on the output shaft, the reverse gear driven gear is freely sleeved on the reverse gear shaft, the reverse gear middle gear is disposed on the reverse gear shaft, one driven gear for forward gears is meshed with the reverse gear driven gear, the reverse gear middle gear is meshed with the main reducer driven gear of the main reducer, the reverse gear shaft synchronizer is disposed on the reverse gear shaft, and the reverse gear shaft synchronizer is selectively joined to or disconnected from the reverse gear driven gear.

In an embodiment of this application, the transmission mechanism includes a plurality of driving gears for forward gears and a plurality of driven gears for forward gears, the plurality of driving gears for forward gears include a first gear driving gear, a second gear driving gear, a third gear driving gear, a fourth gear driving gear, and a fifth gear driving gear, and the plurality of driven gears for forward gears include a first gear driven gear, a second gear driven gear, a third gear driven gear, a fourth gear driven gear, and a fifth gear driven gear; the first gear driving gear, the second gear driving gear, the third gear driving gear, the fourth gear driving gear, and the fifth gear driving gear are fixed on the input shaft, and the first gear driven gear, the second gear driven gear, the third gear driven gear, the fourth gear driven gear, and the fifth gear driven gear are freely sleeved on the output shaft; the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, the fifth gear driving gear is meshed with the fifth gear driven gear, and the reverse gear driven gear is meshed with the first gear driven gear; and a 1/3 gear synchronizer located between the first gear driven gear and the third gear driven gear, a 2/4 gear synchronizer located between the second gear driven gear and the fourth gear driven gear, and a fifth gear synchronizer located on an axial side of the fifth gear driven gear are disposed on the output shaft, the fifth gear synchronizer is selectively joined to or disconnected from the fifth gear driven gear, the 1/3 gear synchronizer is selectively joined to or disconnected from the first gear driven gear and the third gear driven gear, and the 2/4 gear synchronizer is selectively joined to or disconnected from the second gear driven gear and the fourth gear driven gear.

In an embodiment of this application, the transmission mechanism includes a plurality of driving gears for forward gears and a plurality of driven gears for forward gears, the plurality of driving gears for forward gears include a first gear driving gear, a second gear driving gear, a third gear driving gear, and a fourth gear driving gear, and the plurality of driven gears for forward gears include a first gear driven gear, a second gear driven gear, a third gear driven gear, a fourth gear driven gear, and a fifth gear driven gear; the first gear driving gear, the second gear driving gear, the third gear driving gear, and the fourth gear driving gear are fixed on the input shaft, and the first gear driven gear, the second gear driven gear, the third gear driven gear, the fourth gear driven gear, and the fifth gear driven gear are freely sleeved on the output shaft; the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, the input gear is meshed with the fifth gear driven gear, and the reverse gear driven gear is meshed with the first gear driven gear; and a 1/3 gear synchronizer located between the first gear driven gear and the third gear driven gear, a 2/4 gear synchronizer located between the second gear driven gear and the fourth gear driven gear, and a fifth gear synchronizer located on an axial side of the fifth gear driven gear are disposed on the output shaft, the fifth gear synchronizer is selectively joined to or disconnected from the fifth gear driven gear, the 1/3 gear synchronizer is selectively joined to or disconnected from the first gear driven gear and the third gear driven gear, and the 2/4 gear synchronizer is selectively joined to or disconnected from the second gear driven gear and the fourth gear driven gear.

In an embodiment of this application, the transmission mechanism further includes a reverse gear shaft, a reverse gear driven gear, a first middle gear, a reverse gear shaft synchronizer, and a second middle gear, the first middle gear and the second middle gear are freely sleeved on the reverse gear shaft, and the reverse gear driven gear is fixed on the reverse gear shaft; the first middle gear is meshed with one driving gear for forward gears, the reverse gear driven gear is meshed with another driving gear for forward gears, and the second middle gear is meshed with one driven gear for forward gears; and the reverse gear shaft synchronizer is disposed on the reverse gear shaft and is located between the first middle gear and the second middle gear, and the reverse gear shaft synchronizer is selectively joined to or disconnected from the first middle gear and the second middle gear.

In an embodiment of this application, the transmission mechanism includes a plurality of driving gears for forward gears and a plurality of driven gears for forward gears, the plurality of driving gears for forward gears include a first gear driving gear, a second gear driving gear, a third gear driving gear, a fourth gear driving gear, and a fifth gear driving gear, and the plurality of driven gears for forward gears include a second gear driven gear, a third gear driven gear, a fourth gear driven gear, and a fifth gear driven gear; the first gear driving gear is fixed on the input shaft, the second gear driving gear, the third gear driving gear, the fourth gear driving gear, and the fifth gear driving gear are freely sleeved on the input shaft, and the second gear driven gear, the third gear driven gear, the fourth gear driven gear, and the fifth gear driven gear are fixed on the output shaft; the first gear driving gear is meshed with the reverse gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear; the first middle gear is meshed with the fifth gear driving gear, and the second middle gear is meshed with the second gear driven gear; and a 3/5 gear synchronizer located between the third gear driving gear and the fifth gear driving gear and a 2/4 gear synchronizer located between the second gear driving gear and the fourth gear driving gear are disposed on the input shaft, the 3/5 gear synchronizer is selectively joined to or disconnected from the third gear driving gear and the fifth gear driving gear, and the 2/4 gear synchronizer is selectively joined to or disconnected from the second gear driving gear and the fourth gear driving gear.

In an embodiment of this application, the transmission mechanism further includes a reverse gear shaft, a reverse gear driven gear, a reverse gear middle gear, a reverse gear shaft synchronizer, and an output shaft middle gear, the output shaft middle gear is freely sleeved on the output shaft, the reverse gear driven gear and the reverse gear middle gear are fixed on the reverse gear shaft, the input gear is meshed with the reverse gear driven gear, the reverse gear middle gear is meshed with the output shaft middle gear, the reverse gear shaft synchronizer is disposed on the output shaft, and the reverse gear shaft synchronizer is selectively joined to or disconnected from the output shaft middle gear.

In an embodiment of this application, the transmission mechanism includes a plurality of driving gears for forward gears and a plurality of driven gears for forward gears, the plurality of driving gears for forward gears include a first gear driving gear, a second gear driving gear, a third gear driving gear, a fourth gear driving gear, and a fifth gear driving gear, and the plurality of driven gears for forward gears include a first gear driven gear, a second gear driven gear, a third gear driven gear, a fourth gear driven gear, and a fifth gear driven gear; the fifth gear driving gear is freely sleeved on the input shaft, the first gear driving gear, the second gear driving gear, the third gear driving gear, and the fourth gear driving gear are fixed on the input shaft, the first gear driven gear, the second gear driven gear, the third gear driven gear, and the fourth gear driven gear are freely sleeved on the output shaft, and the fifth gear driven gear is fixed on the output shaft; the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear; the first mode synchronizer is disposed between the input gear and the fifth gear driving gear, and the first mode synchronizer is selectively joined to or disconnected from the fifth gear driving gear and the input gear; and a 1/3 gear synchronizer located between the first gear driven gear and the third gear driven gear, a 2/4 gear synchronizer located between the second gear driven gear and the fourth gear driven gear, and an R gear synchronizer located on an axial side of the output shaft middle gear are disposed on the output shaft, the R gear synchronizer is selectively joined to or disconnected from the output shaft middle gear, the 1/3 gear synchronizer is selectively joined to or disconnected from the first gear driven gear and the third gear driven gear, and the 2/4 gear synchronizer is selectively joined to or disconnected from the second gear driven gear and the fourth gear driven gear.

Embodiments of this application further provide a hybrid power-driven system, including an engine, a transmission, and a motor power apparatus, the transmission and the motor power apparatus being two independent modules, the motor power apparatus including a motor and a power distribution mechanism, where the power distribution mechanism includes a motor power distribution shaft, a mode selection apparatus, a first transmission apparatus, and a second transmission apparatus, the motor power distribution shaft is disposed independently from a transmission mechanism, the motor power distribution shaft is disposed independently from the motor, and the hybrid power-driven system is selectively switched between a first mode and a second mode by using the mode selection apparatus; a motor driven gear configured to receive power of the motor is disposed on the motor power distribution shaft; the first transmission apparatus includes a first gear, the first gear is disposed on the motor power distribution shaft, and the first gear is directly meshed with one gear position driving gear on an input shaft of the transmission; the second transmission apparatus includes a second gear, the second gear is disposed on the motor power distribution shaft, the first gear and the second gear are coaxially disposed, and the second gear is directly meshed with a main reducer driven gear of the transmission; and the mode selection apparatus selectively connects the motor and the input shaft of the transmission or the motor and a main reducer of the transmission. In another aspect, embodiments of this application further provide a vehicle, including the foregoing hybrid power-driven system.

For the hybrid power-driven system and the vehicle according to the embodiments of this application, a mode selection apparatus selectively connects a motor and an input shaft of a transmission mechanism or a motor and a main reducer, to enable the motor of the hybrid power-driven system to be switched between two modes. A motor power distribution shaft is disposed independently from the transmission mechanism, and the motor power distribution shaft is disposed independently from the motor. The independently disposed power distribution shaft appropriately utilizes a radial space of the system. It is not necessary to make a significant change to a transmission mechanism of an original engine. A power distribution mechanism may independently transmit power of the motor to a wheel end (the main reducer) without passing through a transmission path of the transmission mechanism (that is, it is not necessary to depend on the input shaft and an output shaft of the transmission mechanism). Transmission paths of a motor end transmission part and a conventional transmission mechanism part have a relatively low degree of overlap (or do not overlap), thereby shortening transmission paths during driving and power generation of the motor. In this way, the control of the system is simpler and more efficient, and efficient transmission of the motor is ensured, thereby resolving the contradiction between transmission efficiency and spatial arrangement to a particular degree. Both the transmission between the power distribution mechanism and the input shaft of the transmission mechanism and the transmission between the power distribution mechanism and a main reducer driven gear of the main reducer are direct transmission, so that while the hybrid power-driven system implements switching between two modes, a transmission path is minimized, thereby greatly improving the transmission efficiency of the system. The hybrid power-driven system may be applied to hybrid electric technologies such as dual-clutch and AMT.

In addition, the hybrid power-driven system and the vehicle in the embodiments of this application further have the following advantages:

(1) For a motor size under a conventional power requirement condition in the industry, a motor and an input gear cannot be directly meshed, an idler gear needs to be added to reserve a mounting space for the motor. In this application, a motor driven gear configured to receive power of the motor is disposed on a motor power distribution shaft, so that the problem of controlling and mounting the motor is resolved, high efficiency of transmission is further ensured, and in addition an axial space for an input shaft or an output shaft of a transmission mechanism is further reduced.

(2) The power distribution shaft shares a power torque of a second mode of the system, to implement power split of an engine and a motor. The power distribution shaft is used to directly split the power of the motor into an input shaft and a main reducer driven gear on a differential. Compared with a solution of outputting power from an output shaft, a strength requirement (for example, a shaft diameter) of an output shaft is reduced, and in addition a strength requirement (for example, the diameter and thickness of a gear) of a main reducer driving gear is reduced. The power distribution shaft is used to share the power torque of the second mode, so that the system has advantages such as low costs, a small volume, a light weight, a long service life, and adequate overall vehicle performance.

(3) The power distribution shaft may be relatively short, so that a compact arrangement of the power distribution shaft and the motor can be implemented, and the power distribution shaft can further be flexibly arranged according to different vehicle body platforms and different spaces.

(4) The independently disposed power distribution shaft appropriately utilizes a radial space of the system, switching between two modes can be implemented without using an input shaft or an output shaft, and in addition efficient transmission of the motor is ensured. Other aspects and advantages of this application will be given in the following description, some of which will become apparent from the following description or may be learned from practices of this application.

What is claimed is:

1. A hybrid power-driven system, comprising an engine, a transmission, and a motor power apparatus, the transmission comprising a transmission mechanism and a main reducer, the motor power apparatus comprising a motor and a power distribution mechanism, wherein the transmission mechanism comprises a clutch apparatus, at least one input shaft, and at least one output shaft, at least one driving gear for forward gears is disposed on the input shaft, at least one driven gear for forward gears correspondingly meshed with the driving gear for forward gears is disposed on the output shaft, an input end of the clutch apparatus is connected to the engine, and the output shaft is connected to the main reducer to transmit power;

the power distribution mechanism comprises a motor power distribution shaft, a mode selection apparatus, a first transmission apparatus, and a second transmission apparatus, the motor power distribution shaft is disposed independently from the transmission mechanism, and the motor power distribution shaft is disposed independently from the motor; and a motor driven gear configured to receive power of the motor is disposed on the motor power distribution shaft; and the first transmission apparatus comprises a first gear and an input gear, the first gear is disposed on the motor power distribution shaft, the input gear is disposed on the input shaft of the transmission mechanism, and the input gear is directly meshed with the first gear; the second transmission apparatus comprises a second gear, the second gear is disposed on the motor power distribution shaft, the first gear and the second gear are coaxially disposed, and the second gear is directly meshed with a main reducer driven gear of the main reducer; and when the mode selection apparatus is connected with the first transmission apparatus, the mode selection apparatus is configured to connect the motor and the input shaft of the transmission mechanism, and when the mode selection apparatus is connected with the second transmission apparatus, the mode selection apparatus is configured to connect the motor and the main reducer.

2. The hybrid power-driven system according to claim 1, wherein the input gear is independently disposed on the input shaft of the transmission mechanism; or
one gear position driving gear on the input shaft of the transmission mechanism is reused as the input gear.

3. The hybrid power-driven system according to claim 1, wherein the hybrid power-driven system is selectively switched between a first mode and a second mode by using the mode selection apparatus; and the mode selection apparatus is independently disposed at a position between the first gear and the second gear on the motor power distribution shaft, and the input gear is fixedly disposed on the input shaft of the transmission mechanism; or
the mode selection apparatus comprises two parts, a first part is disposed on the motor power distribution shaft, a second part is independently disposed on an input gear of the input shaft of the transmission mechanism or a second part and the gear position synchronizer of the transmission mechanism are the same part, and the input gear is freely sleeved on the input shaft of the transmission mechanism.

4. The hybrid power-driven system according to claim 1, wherein the motor driven gear and the first gear are respectively independently disposed, or, the motor driven gear and the first gear are the same gear.

5. The hybrid power-driven system according to claim 1, wherein the first gear is freely sleeved on the motor power distribution shaft, the second gear is freely sleeved on the motor power distribution shaft, and the input gear is fixed on the input shaft of the transmission mechanism; or
the first gear is freely sleeved on the motor power distribution shaft, the second gear is fixed on the motor power distribution shaft, and the input gear is freely sleeved on the input shaft of the transmission mechanism; or
the first gear is fixed on the motor power distribution shaft, the second gear is freely sleeved on the motor power distribution shaft, and the input gear is freely sleeved on the input shaft of the transmission mechanism.

6. The hybrid power-driven system according to claim 1, wherein the second gear is freely sleeved on the motor power distribution shaft, and the first gear and the motor driven gear are respectively independently disposed on the motor power distribution shaft; or
the first gear and the motor driven gear are the same gear, and the same gear is disposed on the motor power distribution shaft.

7. The hybrid power-driven system according to claim 1, wherein the power distribution mechanism further comprises a motor driving gear fixed on an output shaft of the motor, the first gear is freely sleeved on the motor power distribution shaft, the input gear is freely sleeved on the input shaft, the first gear and the motor driving gear are directly meshed or the first gear is meshed with the motor driving gear by an idler gear, and the second gear is fixed on the motor power distribution shaft;
the mode selection apparatus comprises a first mode synchronizer disposed on the input shaft of the transmission mechanism and a second mode synchronizer disposed on the motor power distribution shaft, the first mode synchronizer is selectively joined to or disconnected from the input gear, the second mode synchronizer is selectively joined to or disconnected from the first gear, and the first mode synchronizer is independently disposed or the first mode synchronizer and a gear position synchronizer of the transmission mechanism are the same synchronizer; and
when the first mode synchronizer is joined to the input gear and the second mode synchronizer is disconnected from the first gear, the hybrid power-driven system is switched to a first mode; and when the first mode synchronizer is disconnected from the input gear and the second mode synchronizer is joined to the first gear, the hybrid power-driven system is switched to a second mode.

8. The hybrid power-driven system according to claim 1, wherein the power distribution mechanism further comprises a motor driving gear fixed on an output shaft of the motor, the first gear is fixed on the motor power distribution shaft, the input gear is freely sleeved on the input shaft, the first gear and the motor driving gear are directly meshed or the first gear is meshed with the motor driving gear by an idler gear, and the second gear is freely sleeved on the motor power distribution shaft;
the mode selection apparatus comprises a first mode synchronizer disposed on the input shaft of the transmission mechanism and a second mode synchronizer disposed on the motor power distribution shaft, the first mode synchronizer is selectively joined to or disconnected from the input gear, the second mode synchronizer is selectively joined to or disconnected from the second gear, and the first mode synchronizer is independently disposed or the first mode synchronizer and a gear position synchronizer of the transmission mechanism are the same synchronizer; and
when the first mode synchronizer is joined to the input gear and the second mode synchronizer is disconnected from the second gear, the hybrid power-driven system is switched to a first mode; and when the first mode synchronizer is disconnected from the input gear and the second mode synchronizer is joined to the second gear, the hybrid power-driven system is switched to a second mode.

9. The hybrid power-driven system according to claim 7, wherein the transmission mechanism further comprises a reverse gear shaft, a reverse gear driven gear, a reverse gear middle gear, a reverse gear shaft synchronizer, and an output shaft middle gear, the output shaft middle gear is disposed on the output shaft, the reverse gear driven gear is freely sleeved on the reverse gear shaft, the reverse gear middle gear is fixed on the reverse gear shaft, the input gear is meshed with the reverse gear driven gear, the reverse gear middle gear is meshed with the output shaft middle gear, and the reverse gear shaft synchronizer is selectively joined to or disconnected from the reverse gear driven gear;
the transmission mechanism comprises a plurality of driving gears for forward gears and a plurality of driven gears for forward gears, the plurality of driving gears for forward gears comprise a first gear driving gear, a second gear driving gear, a third gear driving gear, a fourth gear driving gear, and a fifth gear driving gear, and the plurality of driven gears for forward gears comprise a first gear driven gear, a second gear driven gear, a third gear driven gear, a fourth gear driven gear, and a fifth gear driven gear;

the fourth gear driving gear is freely sleeved on the input shaft, the first gear driving gear, the second gear driving gear, the third gear driving gear, and the fifth gear driving gear are fixed on the input shaft, the first gear driven gear, the second gear driven gear, the third gear driven gear, and the fifth gear driven gear are freely sleeved on the output shaft, the fourth gear driven gear is fixed on the output shaft, and the output shaft middle gear is fixed on the output shaft; and the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear;

the first mode synchronizer is disposed between the input gear and the fourth gear driving gear, and the first mode synchronizer is selectively joined to or disconnected from the fourth gear driving gear and the input gear; and a 1/3 gear synchronizer located between the first gear driven gear and the third gear driven gear and a 2/5 gear synchronizer located between the second gear driven gear and the fifth gear driven gear are disposed on the output shaft, the 1/3 gear synchronizer is selectively joined to or disconnected from the first gear driven gear and the third gear driven gear, and the 2/5 gear synchronizer is selectively joined to or disconnected from the second gear driven gear and the fifth gear driven gear.

10. The hybrid power-driven system according to claim 1, wherein the power distribution mechanism further comprises a motor driving gear fixed on an output shaft of the motor, the motor driving gear is meshed with the motor driven gear, the motor driven gear is fixed on the motor power distribution shaft, the first gear and the second gear are freely sleeved on the motor power distribution shaft, and the input gear is fixed on the input shaft;

the mode selection apparatus comprises a first/second mode synchronizer disposed on the motor power distribution shaft, and the first/second mode synchronizer is selectively joined to or disconnected from the first gear and the second gear; and when the first/second mode synchronizer is joined to the first gear, the hybrid power-driven system is switched to a first mode; and when the first/second mode synchronizer is joined to the second gear, the hybrid power-driven system is switched to a second mode.

11. The hybrid power-driven system according to claim 7, wherein the transmission mechanism further comprises a reverse gear shaft, a reverse gear driving gear, a reverse gear driven gear, a reverse gear middle gear, and an output shaft middle gear, the reverse gear driving gear is freely sleeved on the input shaft, the output shaft middle gear is disposed on the output shaft, the reverse gear driven gear and the reverse gear middle gear are fixed on the reverse gear shaft, the reverse gear driving gear is meshed with the reverse gear driven gear, and the reverse gear middle gear is meshed with the output shaft middle gear;

the transmission mechanism comprises a plurality of driving gears for forward gears and a plurality of driven gears for forward gears, the plurality of driving gears for forward gears comprise a first gear driving gear, a second gear driving gear, a third gear driving gear, a fourth gear driving gear, and a fifth gear driving gear, and the plurality of driven gears for forward gears comprise a first gear driven gear, a second gear driven gear, a third gear driven gear, a fourth gear driven gear, and a fifth gear driven gear;

the reverse gear driving gear and the fifth gear driving gear are freely sleeved on the input shaft, the first gear driving gear, the second gear driving gear, the third gear driving gear, and the fourth gear driving gear are fixed on the input shaft, the first gear driven gear, the second gear driven gear, the third gear driven gear, and the fourth gear driven gear are freely sleeved on the output shaft, the fifth gear driven gear is fixed on the output shaft, and the output shaft middle gear is fixed on the output shaft; and the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear;

a 5/R gear synchronizer located between the fifth gear driving gear and the reverse gear driving gear is disposed on the input shaft, and the 5/R gear synchronizer is selectively joined to or disconnected from the fifth gear driving gear and the reverse gear driving gear; and a 1/3 gear synchronizer located between the first gear driven gear and the third gear driven gear and a 2/4 gear synchronizer located between the second gear driven gear and the fourth gear driven gear are disposed on the output shaft, the 1/3 gear synchronizer is selectively joined to or disconnected from the first gear driven gear and the third gear driven gear, and the 2/4 gear synchronizer is selectively joined to or disconnected from the second gear driven gear and the fourth gear driven gear.

12. The hybrid power-driven system according to claim 7, wherein the transmission mechanism further comprises a reverse gear shaft, a reverse gear driven gear, a reverse gear middle gear, a reverse gear shaft synchronizer, and an output shaft middle gear, the output shaft middle gear is freely sleeved on the output shaft, the reverse gear driven gear and the reverse gear middle gear are disposed on the reverse gear shaft, the input gear is meshed with the reverse gear driven gear, the reverse gear middle gear is meshed with the output shaft middle gear, the reverse gear shaft synchronizer is disposed on the output shaft, and the reverse gear shaft synchronizer is selectively joined to or disconnected from the output shaft middle gear;

the transmission mechanism comprises a plurality of driving gears for forward gears and a plurality of driven gears for forward gears, the plurality of driving gears for forward gears comprise a first gear driving gear, a second gear driving gear, a third gear driving gear, a fourth gear driving gear, and a fifth gear driving gear, and the plurality of driven gears for forward gears comprise a first gear driven gear, a second gear driven gear, a third gear driven gear, a fourth gear driven gear, and a fifth gear driven gear;

the first gear driving gear, the second gear driving gear, the third gear driving gear, the fourth gear driving gear, and the fifth gear driving gear are fixed on the input shaft, and the first gear driven gear, the second gear driven gear, the third gear driven gear, the fourth gear driven gear, and the fifth gear driven gear are freely sleeved on the output shaft;

the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear; and a 1/3 gear synchronizer located between the first gear driven gear and the third gear driven gear, a 2/4 gear synchronizer located between the second gear driven gear and the fourth gear driven gear, and a 5/R gear synchronizer located between the fifth gear driven gear and the output shaft middle gear are disposed on the output shaft, the 1/3 gear synchronizer is selectively joined to or disconnected from the first gear driven gear and the third gear driven gear, the 2/4 gear synchronizer is selectively joined to or disconnected from the second gear driven gear and the fourth gear driven gear, and the 5/R gear synchronizer is selectively joined to or disconnected from the fifth gear driven gear and the output shaft middle gear.

13. The hybrid power-driven system according to claim 7, wherein the transmission mechanism further comprises a reverse gear shaft, a reverse gear driven gear, a reverse gear middle gear, a reverse gear shaft synchronizer, and an output shaft middle gear, the output shaft middle gear is freely sleeved on the output shaft, the reverse gear driven gear and the reverse gear middle gear are disposed on the reverse gear shaft, one driving gear for forward gears is meshed with the reverse gear driven gear, the reverse gear middle gear is meshed with the output shaft middle gear, the reverse gear shaft synchronizer is disposed on the output shaft, and the reverse gear shaft synchronizer is selectively joined to or disconnected from the output shaft middle gear;

the transmission mechanism comprises a plurality of driving gears for forward gears and a plurality of driven gears for forward gears, the plurality of driving gears for forward gears comprise a first gear driving gear, a second gear driving gear, a third gear driving gear, a fourth gear driving gear, and a fifth gear driving gear, the plurality of driven gears for forward gears comprise a first gear driven gear, a second gear driven gear, a third gear driven gear, a fourth gear driven gear, and a fifth gear driven gear, and the first gear driving gear is meshed with the reverse gear driven gear;

the first gear driving gear, the second gear driving gear, the third gear driving gear, and the fourth gear driving gear are fixed on the input shaft, the fifth gear driving gear is freely sleeved on the input shaft, the first gear driven gear, the second gear driven gear, the third gear driven gear, and the fourth gear driven gear are freely sleeved on the output shaft, and the fifth gear driven gear is fixed on the output shaft;

the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear; and the first mode synchronizer is disposed between the input gear and the fifth gear driving gear, a 1/3 gear synchronizer located between the first gear driven gear and the third gear driven gear, a 2/4 gear synchronizer located between the second gear driven gear and the fourth gear driven gear, and an R gear synchronizer located on an axial side of the output shaft middle gear are disposed on the output shaft, the first mode synchronizer is selectively joined to or disconnected from the input gear and the fifth gear driving gear, the 1/3 gear synchronizer is selectively joined to or disconnected from the first gear driven gear and the third gear driven gear, the 2/4 gear synchronizer is selectively joined to or disconnected from the second gear driven gear and the fourth gear driven gear, and the R gear synchronizer is selectively joined to or disconnected from the output shaft middle gear.

14. The hybrid power-driven system according to claim 7, wherein the transmission mechanism further comprises a reverse gear shaft, a reverse gear driven gear, a reverse gear middle gear, and a reverse gear shaft synchronizer, the reverse gear driven gear is freely sleeved on the reverse gear shaft, the reverse gear middle gear is disposed on the reverse gear shaft, one driven gear for forward gears is meshed with the reverse gear driven gear, the reverse gear middle gear is meshed with the main reducer driven gear of the main reducer, the reverse gear shaft synchronizer is disposed on the reverse gear shaft, and the reverse gear shaft synchronizer is selectively joined to or disconnected from the reverse gear driven gear.

15. The hybrid power-driven system according to claim 14, wherein the transmission mechanism comprises a plurality of driving gears for forward gears and a plurality of driven gears for forward gears, the plurality of driving gears for forward gears comprise a first gear driving gear, a second gear driving gear, a third gear driving gear, a fourth gear driving gear, and a fifth gear driving gear, and the plurality of driven gears for forward gears comprise a first gear driven gear, a second gear driven gear, a third gear driven gear, a fourth gear driven gear, and a fifth gear driven gear;

the first gear driving gear, the second gear driving gear, the third gear driving gear, the fourth gear driving gear, and the fifth gear driving gear are fixed on the input shaft, and the first gear driven gear, the second gear driven gear, the third gear driven gear, the fourth gear driven gear, and the fifth gear driven gear are freely sleeved on the output shaft;

the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, the fifth gear driving gear is meshed with the fifth gear driven gear, and the reverse gear driven gear is meshed with the first gear driven gear; and a 1/3 gear synchronizer located between the first gear driven gear and the third gear driven gear, a 2/4 gear synchronizer located between the second gear driven gear and the fourth gear driven gear, and a fifth gear synchronizer located on an axial side of the fifth gear driven gear are disposed on the output shaft, the fifth gear synchronizer is selectively joined to or disconnected from the fifth gear driven gear, the 1/3 gear synchronizer is selectively joined to or disconnected from the first gear driven gear and the third gear driven gear, and the 2/4 gear synchronizer is selectively joined to or disconnected from the second gear driven gear and the fourth gear driven gear.

16. The hybrid power-driven system according to claim 14, wherein the transmission mechanism comprises a plurality of driving gears for forward gears and a plurality of driven gears for forward gears, the plurality of driving gears for forward gears comprise a first gear driving gear, a second gear driving gear, a third gear driving gear, and a fourth gear driving gear, and the plurality of driven gears for forward gears comprise a first gear driven gear, a second gear driven gear, a third gear driven gear, a fourth gear driven gear, and a fifth gear driven gear;
the first gear driving gear, the second gear driving gear, the third gear driving gear, and the fourth gear driving gear are fixed on the input shaft, and the first gear driven gear, the second gear driven gear, the third gear driven gear, the fourth gear driven gear, and the fifth gear driven gear are freely sleeved on the output shaft;
the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, the input gear is meshed with the fifth gear driven gear, and the reverse gear driven gear is meshed with the first gear driven gear; and
a 1/3 gear synchronizer located between the first gear driven gear and the third gear driven gear, a 2/4 gear synchronizer located between the second gear driven gear and the fourth gear driven gear, and a fifth gear synchronizer located on an axial side of the fifth gear driven gear are disposed on the output shaft, the fifth gear synchronizer is selectively joined to or disconnected from the fifth gear driven gear, the 1/3 gear synchronizer is selectively joined to or disconnected from the first gear driven gear and the third gear driven gear, and the 2/4 gear synchronizer is selectively joined to or disconnected from the second gear driven gear and the fourth gear driven gear.

17. The hybrid power-driven system according to claim 7, wherein the transmission mechanism further comprises a reverse gear shaft, a reverse gear driven gear, a first middle gear, a reverse gear shaft synchronizer, and a second middle gear, the first middle gear and the second middle gear are freely sleeved on the reverse gear shaft, and the reverse gear driven gear is fixed on the reverse gear shaft;
the first middle gear is meshed with one driving gear for forward gears, the reverse gear driven gear is meshed with the other driving gear for forward gears, and the second middle gear is meshed with one driven gear for forward gears;
the reverse gear shaft synchronizer is disposed on the reverse gear shaft and located between the first middle gear and the second middle gear, and the reverse gear shaft synchronizer is selectively joined to or disconnected from the first middle gear and the second middle gear;
the transmission mechanism comprises a plurality of driving gears for forward gears and a plurality of driven gears for forward gears, the plurality of driving gears for forward gears comprise a first gear driving gear, a second gear driving gear, a third gear driving gear, a fourth gear driving gear, and a fifth gear driving gear, and the plurality of driven gears for forward gears comprise a second gear driven gear, a third gear driven gear, a fourth gear driven gear, and a fifth gear driven gear;

the first gear driving gear is fixed on the input shaft, the second gear driving gear, the third gear driving gear, the fourth gear driving gear, and the fifth gear driving gear are freely sleeved on the input shaft, and the second gear driven gear, the third gear driven gear, the fourth gear driven gear, and the fifth gear driven gear are fixed on the output shaft;
the first gear driving gear is meshed with the reverse gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear;
the first middle gear is meshed with the fifth gear driving gear, and the second middle gear is meshed with the second gear driven gear; and
a 3/5 gear synchronizer located between the third gear driving gear and the fifth gear driving gear and a 2/4 gear synchronizer located between the second gear driving gear and the fourth gear driving gear are disposed on the input shaft, the 3/5 gear synchronizer is selectively joined to or disconnected from the third gear driving gear and the fifth gear driving gear, and the 2/4 gear synchronizer is selectively joined to or disconnected from the second gear driving gear and the fourth gear driving gear.

18. The hybrid power-driven system according to claim 7, wherein the transmission mechanism further comprises a reverse gear shaft, a reverse gear driven gear, a reverse gear middle gear, a reverse gear shaft synchronizer, and an output shaft middle gear, the output shaft middle gear is freely sleeved on the output shaft, the reverse gear driven gear and the reverse gear middle gear are fixed on the reverse gear shaft, the input gear is meshed with the reverse gear driven gear, the reverse gear middle gear is meshed with the output shaft middle gear, the reverse gear shaft synchronizer is disposed on the output shaft, and the reverse gear shaft synchronizer is selectively joined to or disconnected from the output shaft middle gear;
the transmission mechanism comprises a plurality of driving gears for forward gears and a plurality of driven gears for forward gears, the plurality of driving gears for forward gears comprise a first gear driving gear, a second gear driving gear, a third gear driving gear, a fourth gear driving gear, and a fifth gear driving gear, and the plurality of driven gears for forward gears comprise a first gear driven gear, a second gear driven gear, a third gear driven gear, a fourth gear driven gear, and a fifth gear driven gear;
the fifth gear driving gear is freely sleeved on the input shaft, the first gear driving gear, the second gear driving gear, the third gear driving gear, and the fourth gear driving gear are fixed on the input shaft, the first gear driven gear, the second gear driven gear, the third gear driven gear, and the fourth gear driven gear are freely sleeved on the output shaft, the fifth gear driven gear is fixed on the output shaft; the first gear driving gear is meshed with the first gear driven gear, the second gear driving gear is meshed with the second gear driven gear, the third gear driving gear is meshed with the third gear driven gear, the fourth gear driving gear is meshed with the fourth gear driven gear, and the fifth gear driving gear is meshed with the fifth gear driven gear;
the first mode synchronizer is disposed between the input gear and the fifth gear driving gear, and the first mode synchronizer is selectively joined to or disconnected from the fifth gear driving gear and the input gear; and a 1/3 gear synchronizer located between the first gear driven gear and the third gear driven gear, a 2/4 gear synchronizer located between the second gear driven gear and the fourth gear driven gear, and an R gear synchronizer located on an axial side of the output shaft middle gear are disposed on the output shaft, the R gear synchronizer is selectively joined to or disconnected from the output shaft middle gear, the 1/3 gear synchronizer is selectively joined to or disconnected from the first gear driven gear and the third gear driven gear, and the 2/4 gear synchronizer is selectively joined to or disconnected from the second gear driven gear and the fourth gear driven gear.

19. A hybrid power-driven system, comprising an engine, a transmission, and a motor power apparatus, the transmission and the motor power apparatus being two independent modules, the motor power apparatus comprising a motor and a power distribution mechanism, wherein the power distribution mechanism comprises a motor power distribution shaft, a mode selection apparatus, a first transmission apparatus, and a second transmission apparatus, the motor power distribution shaft is disposed independently from a transmission mechanism, the motor power distribution shaft is disposed independently from the motor, and the hybrid power-driven system is selectively switched between a first mode and a second mode by using the mode selection apparatus; and a motor driven gear configured to receive power of the motor is disposed on the motor power distribution shaft; and the first transmission apparatus comprises a first gear, the first gear is disposed on the motor power distribution shaft, the first gear is directly meshed with one gear position driving gear on an input shaft of the transmission, the second transmission apparatus comprises a second gear, the second gear is disposed on the motor power distribution shaft, the first gear and the second gear are coaxially disposed, the second gear is directly meshed with a main reducer driven gear of the transmission, and the mode selection apparatus selectively connects the motor and the input shaft of the transmission or the motor and a main reducer of the transmission.

20. A vehicle, comprising the hybrid power-driven system according to claim 1.

* * * * *